(12) United States Patent
Li et al.

(10) Patent No.: US 12,098,086 B2
(45) Date of Patent: Sep. 24, 2024

(54) DEVICE FOR ADVANCED NITROGEN AND PHOSPHORUS REMOVAL IN SEWAGE TREATMENT

(71) Applicant: YUNNAN HEXU ENVIRONMENTAL TECHNOLOGY CO., LTD., Yunnan (CN)

(72) Inventors: Wensheng Li, Yunnan (CN); Ranrong Liu, Yunnan (CN); Xin Zhang, Yunnan (CN); Zheng Lv, Yunnan (CN); Yulong Li, Yunnan (CN); Yiqiu Fang, Yunnan (CN); Fei Xia, Yunnan (CN)

(73) Assignee: YUNNAN HEXU ENVIRONMENTAL TECHNOLOGY CO., LTD., Yunnan (CN)

( * ) Notice: Subject to any disclaimer, the term of this patent is extended or adjusted under 35 U.S.C. 154(b) by 415 days.

(21) Appl. No.: 17/488,635

(22) Filed: Sep. 29, 2021

(65) Prior Publication Data

US 2022/0017394 A1 Jan. 20, 2022

Related U.S. Application Data

(63) Continuation-in-part of application No. PCT/CN2019/091518, filed on Jun. 17, 2019.

(30) Foreign Application Priority Data

Mar. 29, 2019 (CN) .......................... 201910251204.5

(51) Int. Cl.
*C02F 3/30* (2023.01)
*C02F 3/04* (2023.01)
(Continued)

(52) U.S. Cl.
CPC ................ *C02F 3/308* (2013.01); *C02F 3/04* (2013.01); *C02F 3/108* (2013.01); *C02F 11/12* (2013.01);
(Continued)

(58) Field of Classification Search
CPC .. C02F 3/308; C02F 3/04; C02F 3/108; C02F 11/12; C02F 2101/105; C02F 2101/16;
(Continued)

(56) References Cited

U.S. PATENT DOCUMENTS 5,182,021 A * 1/1993 Spector ................... C02F 3/308
210/906
5,393,427 A * 2/1995 Barnard .................... C02F 3/34
210/906

(Continued)

FOREIGN PATENT DOCUMENTS

CN 201981058 U 9/2011
CN 102531298 A 7/2012
(Continued)

OTHER PUBLICATIONS

Machine-generated English translation of CN 102531298, generated on Jan. 7, 2024.*

(Continued)

*Primary Examiner* — Fred Prince

(57) ABSTRACT

A device for advanced nitrogen and phosphorus removal in sewage treatment includes a pre-denitrification zone, an anaerobic zone, an anoxic zone, an aerobic zone, a sedimentation zone, a biological filtration zone, and a clear water zone, where a sludge return system is provided between the pre-denitrification zone and the sedimentation zone; a nitrification liquid return system is provided between the anoxic zone and the aerobic zone; a filler layer is provided in the biological filtration zone, and the filler layer divides a cavity in the biological filtration zone to form an upper water inlet cavity and a lower water outlet cavity; a backwash aeration pipe is provided in the water outlet cavity, and a backwash water outlet is formed in the water inlet cavity; and the backwash water outlet is connected to (Continued)

a sludge concentration and storage tank or the pre-denitrification zone.

20 Claims, 15 Drawing Sheets

(51) Int. Cl.
*C02F 3/10* (2023.01)
*C02F 11/12* (2019.01)
*C02F 101/10* (2006.01)
*C02F 101/16* (2006.01)
*C02F 101/38* (2006.01)

(52) U.S. Cl.
CPC .... *C02F 2101/105* (2013.01); *C02F 2101/16* (2013.01); *C02F 2101/38* (2013.01); *C02F 2203/006* (2013.01); *C02F 2301/046* (2013.01); *C02F 2303/04* (2013.01); *C02F 2303/16* (2013.01); *Y02W 10/10* (2015.05)

(58) Field of Classification Search
CPC ............ C02F 2101/38; C02F 2203/006; C02F 2301/046; C02F 2303/04; C02F 2303/16; Y02W 10/10
USPC ......... 210/195.1, 195.3, 196, 197, 605, 615, 210/616, 618, 621, 622, 623, 903, 906, 210/617
See application file for complete search history.

(56) References Cited

U.S. PATENT DOCUMENTS

| | | | |
|---|---|---|---|
| 5,601,719 A | * | 2/1997 | Hawkins ................. C02F 3/308 |
| | | | 210/906 |
| 2002/0104798 A1 | * | 8/2002 | Takechi ................. C02F 3/1215 |
| | | | 210/605 |
| 2005/0087480 A1 | * | 4/2005 | Park ........................ C02F 3/308 |
| | | | 210/96.1 |

FOREIGN PATENT DOCUMENTS

| | | | |
|---|---|---|---|
| CN | 202543000 U | * | 11/2012 |
| CN | 104003520 A | | 8/2014 |
| CN | 204529455 U | | 8/2015 |
| CN | 105293834 A | | 2/2016 |
| CN | 105347489 A | | 2/2016 |
| CN | 205442950 U | | 8/2016 |
| CN | 107954566 A | * | 4/2018 |
| CN | 109879426 A | | 6/2019 |
| JP | H07171594 A | | 7/1995 |

OTHER PUBLICATIONS

Machine-generated English translation of CN 107954566, generated on Jan. 7, 2024.*
Machine-generated English translation of CN 202543000, generated on Jan. 7, 2024.*
Machine-generated English translation of CN 109879426, generated on Jan. 7, 2024.*
Machine-generated English translation of CN 105347489, generated on Jan. 7, 2024.*
Machine-generated English translation of CN 204529455, generated on Jan. 7, 2024.*
Machine-generated English translation of CN 201981058, generated on Jan. 7, 2024.*
Machine-generated English translation of JP 7-171594, generated on Jan. 7, 2024.*
International Search Report of PCT Patent Application No. PCT/CN2019/091518 issued on Jan. 3, 2020.

* cited by examiner

DEVICE FOR ADVANCED NITROGEN AND PHOSPHORUS REMOVAL IN SEWAGE TREATMENT

CROSS REFERENCE TO RELATED APPLICATIONS

The present application is a Continuation-In-Part Application of PCT Application No. PCT/CN2019/091518 filed on Jun. 17, 2019, which claims the benefit of Chinese Patent Application No. 201910251204.5 filed on Mar. 29, 2019. All the above are hereby incorporated by reference in their entirety.

TECHNICAL FIELD

The present disclosure relates to the technical field of sewage treatment, and in particular to a device for advanced nitrogen and phosphorus removal in sewage treatment.

BACKGROUND

With the development of social economy, contents of nitrogen and phosphorus in domestic sewage continue to increase. As a result, water eutrophication is becoming increasingly serious. At present, due to living habits, sewage in many places, especially in rural areas, has a low carbon/nitrogen ratio (hereinafter referred to as C/N) and a low carbon/phosphorus ratio (hereinafter referred to as C/P), which affects the biological nitrogen and phosphorus removal effect in sewage treatment. Therefore, a traditional sewage treatment process is in urgent need of innovation.

The traditional step feed process is used in the multi-stage anoxic/oxic (A/O) process, which separately feed water into an anoxic zone of each stage, thus ensures that there is sufficient carbon source in the anoxic zone of each stage, thereby improving a total nitrogen removal efficiency. However, the step feed method for improving a total phosphorus removal efficiency is rarely reported. Therefore, it is an urgent technical problem to develop a method giving consideration to both total nitrogen removal efficiency and total phosphorus removal efficiency.

The denitrification in an ordinary anaerobic/anoxic/oxic ($A^2O$) process is completed by an anoxic tank and an anaerobic tank, where nitrate nitrogen in return sludge undergoes denitrification in the anaerobic tank, and nitrate nitrogen in nitrification return liquid undergoes denitrification in the anoxic tank; and a tank volume of the anaerobic tank or anoxic tank is directly proportional to a nitrogen load and is inversely proportional to a denitrification rate. When C/N and C/P ratios in sewage are high, even if nitrate nitrogen in return sludge consumes part of a carbon source, there is still enough carbon source for phosphate accumulating organisms (PAOs), and thus the biological phosphorus removal effect will not be affected. However, when C/N and C/P ratios in sewage are low, the interference of nitrate nitrogen in return sludge on biological phosphorus removal is significant. Therefore, how to reduce the interference of nitrate nitrogen in return sludge on phosphorus removal has become a key technical issue.

In addition, based on the activated sludge process, a filtration process is necessary to keep the suspended solid particle (SS) concentration below 10 mg/L, and filtration is often conducted using a mid-pass fiber membrane, a flat membrane, or a sand filtration device. The mid-pass fiber membrane or flat membrane has a limited service life, resulting in high investment, cleaning, maintenance, and replacement costs. For the treatment of decentralized sewage, a water inlet scale is often small, in which case, the sand filtration device also has a relatively high investment cost per ton of water; and as filter media such as quartz sand are often heavy and have fine particles, a backwash process involves high energy consumption, and a filter pump and a backwash pump need to be arranged separately. Therefore, there is an urgent need for a filtration technology with low investment cost, long service life, and low energy consumption to fill a vacancy in this technical field.

SUMMARY

The technical problem to be solved by the present disclosure is to provide a device for advanced nitrogen and phosphorus removal in sewage treatment, which can avoid the interference of nitrate nitrogen in return sludge on biological phosphorus removal. Especially for sewage with low C/N and C/P ratios, the device can improve the efficiency of phosphorus and nitrogen removal while reducing a chemical oxygen demand (COD).

In order to solve the above technical problem, the present disclosure provides a device for advanced nitrogen and phosphorus removal in sewage treatment, including a pre-denitrification zone, an anaerobic zone, an anoxic zone, an aerobic zone, a sedimentation zone, a biological filtration zone, and a clear water zone that communicate with each other in sequence according to a sewage treatment process, where a sludge return system is provided between the pre-denitrification zone and the sedimentation zone, and the sludge return system can return sludge in the sedimentation zone to the pre-denitrification zone; a nitrification liquid return system is provided between the anoxic zone and the aerobic zone, and the nitrification liquid return system can return a nitrification liquid in the aerobic zone to the anoxic zone; a filler layer is provided in the biological filtration zone, and the filler layer divides a cavity in the biological filtration zone to form an upper water inlet cavity and a lower water outlet cavity; the water inlet cavity communicates with a top of the sedimentation zone, and the water outlet cavity communicates with a bottom of the clear water zone; a backwash aeration pipe is provided in the water outlet cavity, and a backwash water outlet is formed in the water inlet cavity; and the backwash water outlet is connected to a sludge concentration and storage tank or the pre-denitrification zone.

As a preferred solution of the present disclosure, the sludge return system may include a return channel; a sludge outlet end of the return channel may be connected to the pre-denitrification zone, and a sludge inlet end of the return channel may be connected to the sedimentation zone; and the return channel may be a U-shaped flat groove that is horizontally erected on tops of the pre-denitrification zone, the anaerobic zone, the anoxic zone, the aerobic zone, and the sedimentation zone.

As a preferred solution of the present disclosure, the device for advanced nitrogen and phosphorus removal in sewage treatment may further include a water inlet system; the water inlet system may include a water inlet main pipe, a first connecting pipe, a second connecting pipe, a third connecting pipe, a first straight union connector, and a second straight union connector; a water inlet end of the water inlet main pipe may be connected to an adjusting tank;

according to a water quality of influent water, a water inlet position of a pipeline may be adjusted specifically based on the following three arrangements:

1) a first water outlet end of the water inlet main pipe, the second straight union connector, the second connecting pipe, the first straight union connector, and the first connecting pipe are connected in sequence to form a first water inlet channel communicating with the pre-denitrification zone; a second water outlet end of the water inlet main pipe and the third connecting pipe are connected in sequence to form a second water inlet channel communicating with the sludge inlet end of the return channel; and the sludge outlet end of the return channel communicates with the pre-denitrification zone;

2) the first water outlet end of the water inlet main pipe, the second straight union connector, and the second connecting pipe are connected in sequence to form a third water inlet channel communicating with the anaerobic zone; the second water outlet end of the water inlet main pipe and the third connecting pipe are connected in sequence to form the second water inlet channel communicating with the sludge inlet end of the return channel; and the sludge outlet end of the return channel communicates with the pre-denitrification zone;

3) the first water outlet end of the water inlet main pipe and the second straight union connector are connected in sequence to form a fourth water inlet channel communicating with the anoxic zone; the second water outlet end of the water inlet main pipe and the third connecting pipe are connected in sequence to form the second water inlet channel communicating with the sludge inlet end of the return channel; and the sludge outlet end of the return channel communicates with the pre-denitrification zone; and a first valve may be provided at the first water outlet end of the water inlet main pipe, and a second valve may be provided at the second water outlet end of the water inlet main pipe.

As a preferred solution of the present disclosure, when the water inlet position of the pipeline is in arrangement 2), a water intake of the pre-denitrification zone may account for 5% to 30% of the total water intake, and a water intake of the anaerobic zone may account for 70% to 95% of the total water intake.

As a preferred solution of the present disclosure, the anoxic zone may be composed of at least one anoxic tank, and if there are two or more anoxic tanks, the two or more anoxic tanks may communicate with each other in sequence; and the aerobic zone may be composed of at least one aerobic tank, and if there are two or more aerobic tanks, the two or more aerobic tanks may communicate with each other in sequence.

As a preferred solution of the present disclosure, a PAC agent addition device may be provided at a tail end of the aerobic zone.

As a preferred solution of the present disclosure, a disinfection device may be provided at a tail end of the clear water zone.

As a preferred solution of the present disclosure, a carbon source addition device may be provided at a head end of each of the pre-denitrification zone, the anaerobic zone, and the anoxic zone.

As a preferred solution of the present disclosure, the backwash water outlet may be close to an upper surface of the filler layer.

As a preferred solution of the present disclosure, a height of the filler layer may account for 20% to 70% of a height of the biological filtration zone.

As a preferred solution of the present disclosure, a filler in the filler layer may be a sponge or a plastic particle; the sponge may be a cube with a side length of 0.1 cm to 3 cm; and the plastic particle may be a cylinder with a diameter of 0.1 cm to 3 cm and a height of 0.1 cm to 5 cm, or the plastic particle may be a cuboid with a side length of 0.1 cm to 3 cm.

As a preferred solution of the present disclosure, a solenoid valve may be provided at an air inlet end of the backwash aeration pipe.

As a preferred solution of the present disclosure, the backwash water outlet may be connected to the sludge concentration and storage tank or the pre-denitrification zone through a first air stripping device.

As a preferred solution of the present disclosure, the sludge return system may further include a second air stripping device, and the second air stripping device can return the sludge in the sedimentation zone to the pre-denitrification zone through air stripping.

As a preferred solution of the present disclosure, the nitrification liquid return system may include a third air stripping device, and the third air stripping device can return the nitrification liquid in the aerobic zone to the anoxic zone.

As a preferred solution of the present disclosure, a top of a partition wall between the aerobic zone and the sedimentation zone may be provided with a filler intercepting grid device; the filler intercepting grid device may include a grid for intercepting a filler and fiber debris in the aerobic zone and a first aeration pipe for flushing the filler and the fiber debris on the grid; the grid may be partly above a liquid level in the aerobic zone; a water inlet side of the grid may face towards the aerobic zone, and a water outlet side of the grid may face towards the sedimentation zone; and at least one first aeration pipe may be provided below the grid and close to the water inlet side of the grid.

As a preferred solution of the present disclosure, a second aeration pipe may be provided in the aerobic zone.

As a preferred solution of the present disclosure, a filler in the anoxic zone may be a sponge or a plastic particle; the sponge may be a cube with a side length of 0.5 cm to 5 cm; and the plastic particle may be a cylinder with a diameter of 0.5 cm to 3 cm and a height of 0.5 cm to 5 cm, or the plastic particle may be a cuboid with a side length of 0.5 cm to 5 cm; and filaments of the fiber rope are in a three-dimensional (3D) radial ring structure, and the fiber rope has a diameter of 20 mm to 60 mm and a surface area of 100 $m^2$/m to 190 $m^2$/m.

As a preferred solution of the present disclosure, a filler in the aerobic zone may be a sponge or a plastic particle; the sponge may be a cube with a side length of 0.5 cm to 5 cm; and the plastic particle may be a cylinder with a diameter of 0.5 cm to 3 cm and a height of 0.5 cm to 5 cm, or the plastic particle may be a cuboid with a side length of 0.5 cm to 5 cm; and filaments of the fiber rope are in a 3D radial ring structure, and the fiber rope has a diameter of 20 mm to 60 mm and a surface area of 100 $m^2$/m to 190 $m^2$/m.

As a preferred solution of the present disclosure, a ratio of a volume of the filler in the aerobic zone to an effective volume of the aerobic zone may be 0.2 to 0.6.

As a preferred solution of the present disclosure, the sedimentation zone may be provided with a water storage tank and a plurality of sludge buckets; each side wall of the water storage tank may be a corrugated plate; the plurality of sludge buckets may be arranged side by side at a bottom of the water storage tank; a connecting plate may be provided between a recess of the corrugated plate and a top of the sludge bucket; a shape of the connecting plate may match a shape of the recess of the corrugated plate, and the connecting plate may be inclined downwards from the corrugated plate to the sludge bucket; the water storage tank, the sludge bucket, and the connecting plate may be coated with an anti-corrosive paint; an water inlet may be formed at a lower part of the side wall of the water storage tank; and the sludge bucket may have an inverted cone structure.

As a preferred solution of the present disclosure, the sedimentation zone may be provided with an air-stripping skimming device; the air-stripping skimming device may include a skimmer, a first vertical pipe, a second vertical pipe, an expansion joint, an air-stripping mechanism, and an output main pipe; the skimmer may be suspended above a liquid surface in the sedimentation zone; a scum outlet end of the skimmer may be connected to an upper end of the first vertical pipe, a lower end of the first vertical pipe may be connected to an upper end of the expansion joint, a lower end of the expansion joint may be connected to an upper end of the second vertical pipe, a lower end of the second vertical pipe may be connected to the output main pipe through the air-stripping mechanism, and an output end of the output main pipe may be connected to an adjusting tank outside the device or a front end zone inside the device; the air-stripping mechanism may include a scum discharge pipe and an air supply pipe; a scum inlet end of the scum discharge pipe may be connected to the lower end of the second vertical pipe, and a scum outlet end of the scum discharge pipe may be connected to the output main pipe; the air supply pipe may have an air inlet and an air outlet; the air inlet may be connected to an air pump, and the air outlet may be connected to the scum discharge pipe; and the air supply pipe may be provided with a valve.

As a preferred solution of the present disclosure, the pre-denitrification zone, the anaerobic zone, the anoxic zone, the aerobic zone, the sedimentation zone, the biological filtration zone, and the clear water zone may be each provided with a water storage tank; a drainage port may be formed on a bottom plate of the water storage tank, and an emptying device may be provided at the drainage port; the emptying device may include a drainage channel and a filter screen; the drainage channel may communicate with the drainage port and may be fixedly arranged on an outer surface of the bottom plate; a notch of the drainage channel may match the drainage port; a side wall of the drainage channel may be provided with a horizontally arranged drainage pipe; the filter screen may have a 3D structure and cover above the drainage port; the filter screen may be provided with a plurality of filter surfaces, and each of the plurality of filter surfaces may be provided with a plurality of filter pores.

Compared with the prior art, the device for advanced nitrogen and phosphorus removal in sewage treatment according to the present disclosure has the following working process: raw water (namely, domestic sewage) enters the pre-denitrification zone, where under the action of denitrifying bacteria, organic matters in the raw water undergo denitrification with nitrate nitrogen in sludge returned from the sedimentation zone to the pre-denitrification zone; a sludge-containing mixed liquor obtained after the denitrification in the pre-denitrification zone enters the anaerobic zone to undergo a biological phosphorus removal reaction; a sludge-containing mixed liquor discharged from the anaerobic zone enters the anoxic zone to undergo denitrification with a nitrification liquid returned from the aerobic zone to the anoxic zone; a sludge-containing mixed liquor obtained after the denitrification in the anoxic zone enters the aerobic zone to undergo nitrification, and part of the nitrification liquid is returned from the aerobic zone to the anoxic zone through the nitrification liquid return system; a sludge-containing mixed liquor discharged from the aerobic zone enters the sedimentation zone for sedimentation to obtain a supernatant and sludge; the supernatant is filtered through the biological filtration zone to remove SS; part of the sludge is returned from the sedimentation zone to the pre-denitrification zone through the sludge return system, and the remaining sludge is discharged outwards; and clear water obtained after the filtration by the biological filtration zone enters the clear water zone.

The pre-denitrification zone is provided to receive influent sewage (namely, raw water) from an adjusting tank and return sludge from the sedimentation zone, and to fully remove nitrates and oxygen in the influent sewage and return sludge under anoxic conditions. The anaerobic zone is provided to greatly improve the phosphorus release efficiency of PAOs in a strict anaerobic environment and thus make the phosphorus absorption efficiency in the aerobic zone fully improved, thereby cooperating with the aerobic zone for phosphorus removal. The anoxic zone is provided to allow denitrifying bacteria to reduce nitrate into nitrogen with nitrogen in the nitrate as an electron acceptor at an extremely low dissolved oxygen concentration, thereby realizing denitrification of sewage. Moreover, the denitrification can provide partial alkalinity to provide favorable conditions for the subsequent nitrification in the aerobic zone. Thus, the anoxic zone mainly realizes the function of denitrification. The aerobic zone is provided to make microorganisms in activated sludge use one part of organic matters in sewage to synthesize new cells and catabolize the other part of the organic matters to obtain energy necessary for cell synthesis under aerobic conditions, where final products are stable substances such as $CO_2$ and $H_2O$. While the organic matters are oxidized, the organic nitrogen and free ammonia nitrogen in the sewage are gradually converted into nitrites and nitrates under sufficient dissolved oxygen. PAOs excessively absorb phosphorus in sewage to form high-concentration phosphorus-containing sludge. Thus, the aerobic zone mainly realizes the functions of organic matter degradation, ammonia nitrogen nitrification, and excessive phosphorus uptake. The nitrification liquid return system is provided to return nitrification liquid in the aerobic zone to the anoxic zone to achieve denitrification. The sludge return system is provided to return activated sludge in the sedimentation zone to the pre-denitrification zone to maintain a sludge concentration in a system and make influent sewage (namely, raw water) undergo denitrification with return sludge (namely, activated sludge) in the sedimentation zone under anoxic conditions.

It can be known that the present disclosure clarifies the functional orientation of the pre-denitrification zone, the anaerobic zone, the anoxic zone, and the aerobic zone, optimizes the layout and structure of the sludge return system and the nitrification liquid return system, and fully combines the advantages of the activated sludge process and the biological contact oxidation process, which can avoid the interference of nitrate nitrogen in return sludge on biological phosphorus removal, reduce COD and improve the efficiency of phosphorus and nitrogen removal especially for sewage with low C/N and C/P ratios, and strengthen the sewage treatment effect of the device.

In addition, due to the design of the biological filtration zone, in operation, a supernatant in the sedimentation zone flows from an upper part of the biological filtration zone into the water inlet cavity under gravity and thus is filtered through the filler layer, and filtered water flows from the water outlet cavity into the clear water zone, thereby reducing an SS value of effluent water. In addition, aerobic microorganisms can grow adherently on a surface of the filler in the filler layer and further remove organic matters and ammonia nitrogen in the sewage to reduce $COD_{cr}$ in effluent water. Moreover, the backwash aeration pipe can be opened to backwash the filler layer to remove impurities trapped in the filler layer; a sludge-containing mixed liquor obtained after the backwash in the water inlet cavity can flow through the backwash water outlet to the sludge concentration and storage tank or the pre-denitrification zone; and clear water in the clear water zone flows back to the water inlet cavity due to a liquid level difference between the clear water zone and the biological filtration zone to be re-filtered and re-backwashed, thereby further reducing an SS value of effluent water and improving the filtration effect. The work flow of the biological filtration zone is simple and easy to operate, and does not require a water pump to provide a filtration power, nor a backwash pump to provide a backwash power.

BRIEF DESCRIPTION OF DRAWINGS

In order to explain the technical solutions of the examples of the present disclosure more clearly, accompanying drawings of the examples will be briefly introduced below.

DETAILED DESCRIPTION

Figure 1:
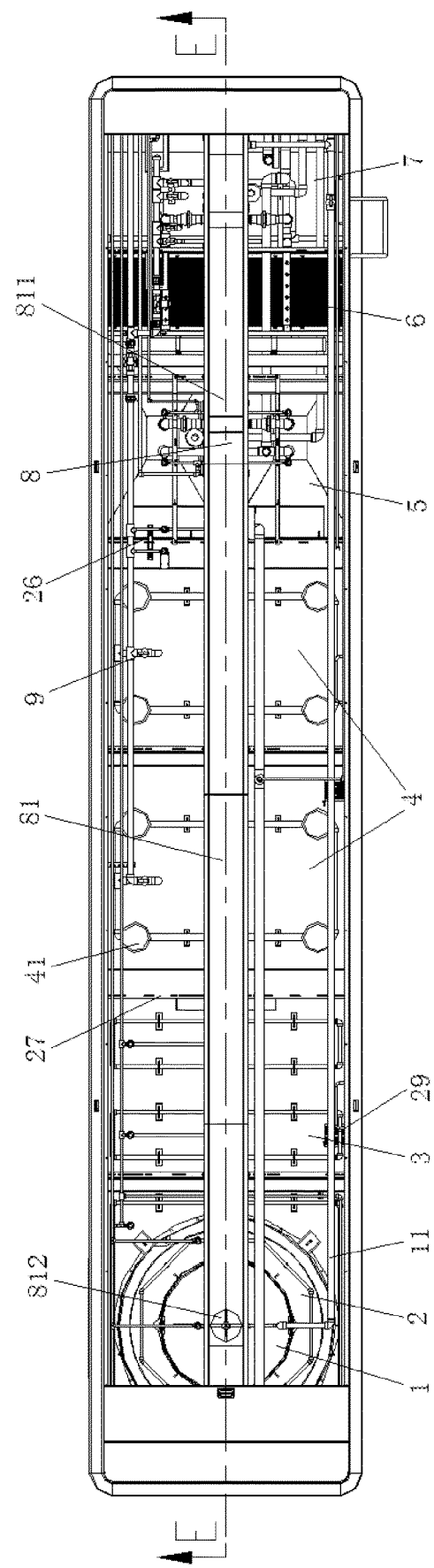
FIG. 1 is a schematic structural diagram of the device for advanced nitrogen and phosphorus removal in sewage treatment provided by the present disclosure.

The technical solutions in the examples of the present disclosure are clearly and completely described below with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

As shown in FIG. 1 to FIG. 5, a preferred example of the device for advanced nitrogen and phosphorus removal in sewage treatment according to the present disclosure includes a pre-denitrification zone 1, an anaerobic zone 2, an anoxic zone 3, an aerobic zone 4, a sedimentation zone 5, a biological filtration zone 6, and a clear water zone 7 that communicate with each other in sequence according to a sewage treatment process, where a sludge return system 8 is provided between the pre-denitrification zone 1 and the sedimentation zone 5, and the sludge return system 8 can return sludge in the sedimentation zone 5 to the pre-denitrification zone 1; a nitrification liquid return system 9 is provided between the anoxic zone 3 and the aerobic zone 4, and the nitrification liquid return system 9 can return a nitrification liquid in the aerobic zone 4 to the anoxic zone 3; a filler layer 61 is provided in the biological filtration zone 6, and the filler layer 61 divides a cavity in the biological filtration zone 6 to form an upper water inlet cavity 62 and a lower water outlet cavity 63; the water inlet cavity 62 communicates with a top of the sedimentation zone 5, and the water outlet cavity 63 communicates with a bottom of the clear water zone 7; a backwash aeration pipe 64 is provided in the water outlet cavity 63, and a backwash water outlet 65 is formed in the water inlet cavity 62; and the backwash water outlet 65 is connected to a sludge concentration and storage tank 10 or the pre-denitrification zone 1. The sludge concentration and storage tank 10 (namely, a sludge tank) may be provided outside the device.

The device for advanced nitrogen and phosphorus removal in sewage treatment according to the present disclosure has the following working process:

a. raw water (namely, domestic sewage) enters the pre-denitrification zone 1, where organic matters in the raw water undergo denitrification with nitrate nitrogen in sludge returned from the sedimentation zone 5 to the pre-denitrification zone 1;

b. a sludge-containing mixed liquor obtained after the denitrification in the pre-denitrification zone 1 enters the anaerobic zone 2 to undergo a biological phosphorus removal reaction;

c. a sludge-containing mixed liquor discharged from the anaerobic zone 2 enters the anoxic zone 3 to undergo denitrification with a nitrification liquid returned from the aerobic zone 4 to the anoxic zone 3;

d. a sludge-containing mixed liquor obtained after the denitrification in the anoxic zone 3 enters the aerobic zone 4 to undergo nitrification, and part of the nitrification liquid is returned from the aerobic zone 4 to the anoxic zone 3 through the nitrification liquid return system 9;

e. a sludge-containing mixed liquor discharged from the aerobic zone 4 enters the sedimentation zone 5 for sedimentation to obtain a supernatant and sludge; the supernatant is filtered through the biological filtration zone 6 to remove SS; and part of the sludge is returned from the sedimentation zone 5 to the pre-denitrification zone 1 through the sludge return system 8, and the remaining sludge is discharged outwards (namely, the sludge concentration and storage tank 10); and f. clear water obtained after the filtration through the biological filtration zone 6 enters the clear water zone 7.

The pre-denitrification zone 1 is provided to receive influent sewage (namely, raw water) from an adjusting tank and return sludge from the sedimentation zone 5, and to fully remove nitrates and oxygen in the influent sewage and return sludge under anoxic conditions, thereby creating a strict anaerobic environment in the anaerobic zone 2 to strengthen the anaerobic phosphorus release effect of PAOs. The anaerobic zone 2 is provided to greatly improve the phosphorus release efficiency of PAOs in a strict anaerobic environment and thus make the phosphorus absorption efficiency in the aerobic zone 4 fully improved, thereby cooperating with the aerobic zone 4 for phosphorus removal. The anoxic zone 3 is provided to allow denitrifying bacteria to reduce nitrate into nitrogen with nitrogen in the nitrate as an electron acceptor at an extremely low dissolved oxygen concentration, thereby realizing denitrification of sewage. Moreover, the denitrification can provide partial alkalinity to provide favorable conditions for the subsequent nitrification in the aerobic zone 4. Thus, the anoxic zone 3 mainly realizes the function of denitrification. The aerobic zone 4 is provided to make microorganisms in activated sludge use one part of organic matters in sewage to synthesize new cells and catabolize the other part of the organic matters to obtain energy necessary for cell synthesis under aerobic conditions, where final products are stable substances such as $CO_2$ and $H_2O$. While the organic matters are oxidized, the organic nitrogen and free ammonia nitrogen in the sewage are gradually converted into nitrites and nitrates under sufficient dissolved oxygen. PAOs excessively absorb phosphorus in sewage to form high-concentration phosphorus-containing sludge. Thus, the aerobic zone 4 mainly realizes the functions of organic matter degradation, ammonia nitrogen nitrification, and excessive phosphorus uptake. The nitrification liquid return system 9 is provided to return a nitrification liquid in the aerobic zone 4 to the anoxic zone 3 to achieve denitrification. The sludge return system 8 is provided to return activated sludge in the sedimentation zone 5 to the pre-denitrification zone 1 to maintain a sludge concentration in a system and make influent sewage (namely, raw water) undergo denitrification with return sludge (namely, activated sludge) in the sedimentation zone 5 under anoxic conditions.

It should be noted that a nitrification liquid is returned from the aerobic zone 4 to the anoxic zone 3 in the present disclosure, but a nitrification liquid is returned from the sedimentation zone 5 to the anoxic zone 3 in the prior art; the present disclosure can make a flow rate of a mixed liquor entering the sedimentation zone 5 smaller, a sludge sedimentation and separation effect better, and a device layout simpler; and the return of a supernatant (nitrification liquid) in the sedimentation zone 5 in the prior art will cause the mixed liquor in the sedimentation zone 5 to be stirred, which is not conducive to the sedimentation of sludge. Preferably, a position of a water intake for nitrification liquid return may be behind a grid 261 of a filler intercepting grid device 26 described below and inside a guide plate of the sedimentation zone 5, that is, the nitrification liquid enters the sedimentation zone 5 just from the aerobic zone 4 through the grid, thereby preventing the nitrification liquid from blocking the water intake for nitrification liquid return.

It can be known that the present disclosure clarifies the functional orientation of the pre-denitrification zone 1, the anaerobic zone 2, the anoxic zone 3, and the aerobic zone 4, optimizes the layout and structure of the sludge return system 8 and the nitrification liquid return system 9, and fully combines the advantages of the activated sludge process and the biological contact oxidation process, which can avoid the interference of nitrate nitrogen in return sludge on biological phosphorus removal, reduce COD and improve the efficiency of phosphorus and nitrogen removal especially for sewage with low C/N and C/P ratios, and strengthen the sewage treatment effect of the device.

In addition, due to the design of the biological filtration zone 6, in operation, a supernatant in the sedimentation zone 5 flows from an upper part of the biological filtration zone 6 into the water inlet cavity 62 under gravity and thus is filtered through the filler layer 61, and filtered water flows from the water outlet cavity 63 into the clear water zone 7, thereby reducing an SS value of effluent water. In addition, aerobic microorganisms can grow adherently on a surface of the filler in the filler layer 61 and further remove organic matters and ammonia nitrogen in the sewage to reduce $COD_{cr}$ in effluent water. Moreover, the backwash aeration pipe 64 can be opened to backwash the filler layer 61 to remove impurities trapped in the filler layer 61; a sludge-containing mixed liquor obtained after the backwash in the water inlet cavity 62 can flow through the backwash water outlet 65 to the sludge concentration and storage tank 10 or the pre-denitrification zone 1; and clear water in the clear water zone 7 flows back to the water inlet cavity 62 due to a liquid level difference between the clear water zone 7 and the biological filtration zone 6 for repeated filtration and backwashed, thereby further reducing an SS value of effluent water and improving the filtration effect. The work flow of the biological filtration zone 6 is simple and easy to operate, and does not require a water pump to provide a filtration power, nor a backwash pump to provide a backwash power, which is energy-saving and reliable.

Figure 2:
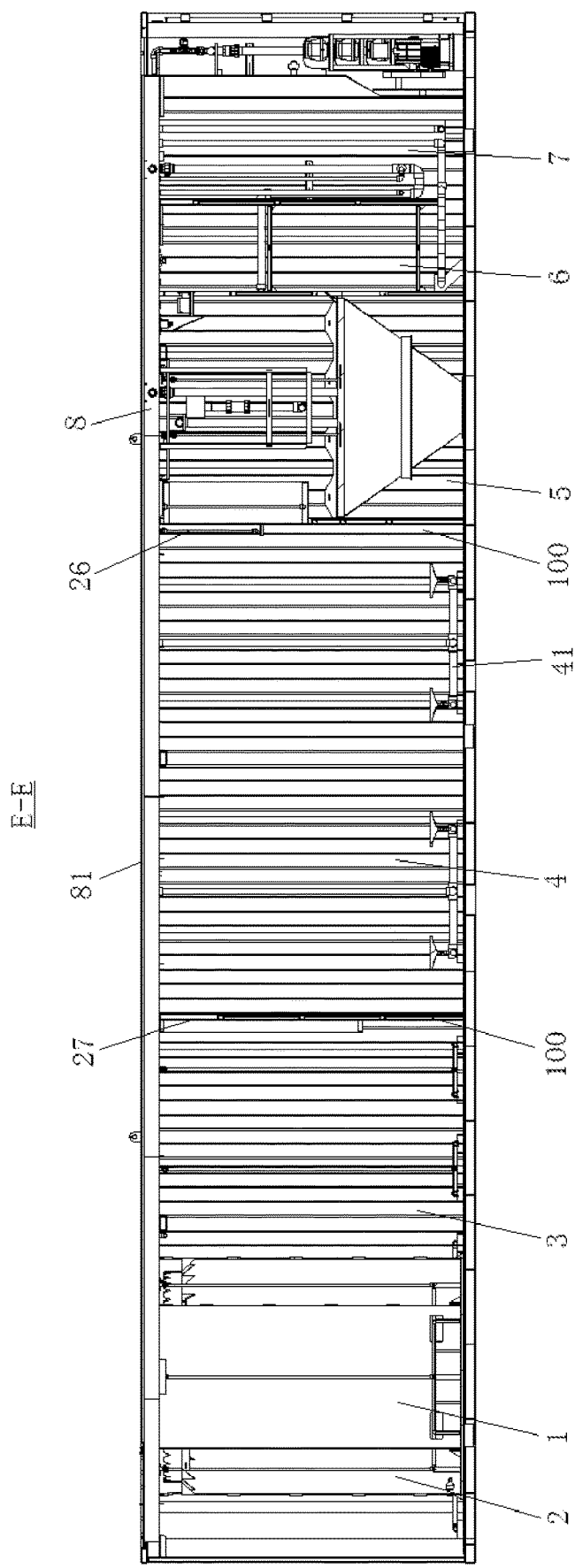
FIG. 2 is a sectional view of the structure shown in FIG. 1 in an E-E direction.
Figure 3:
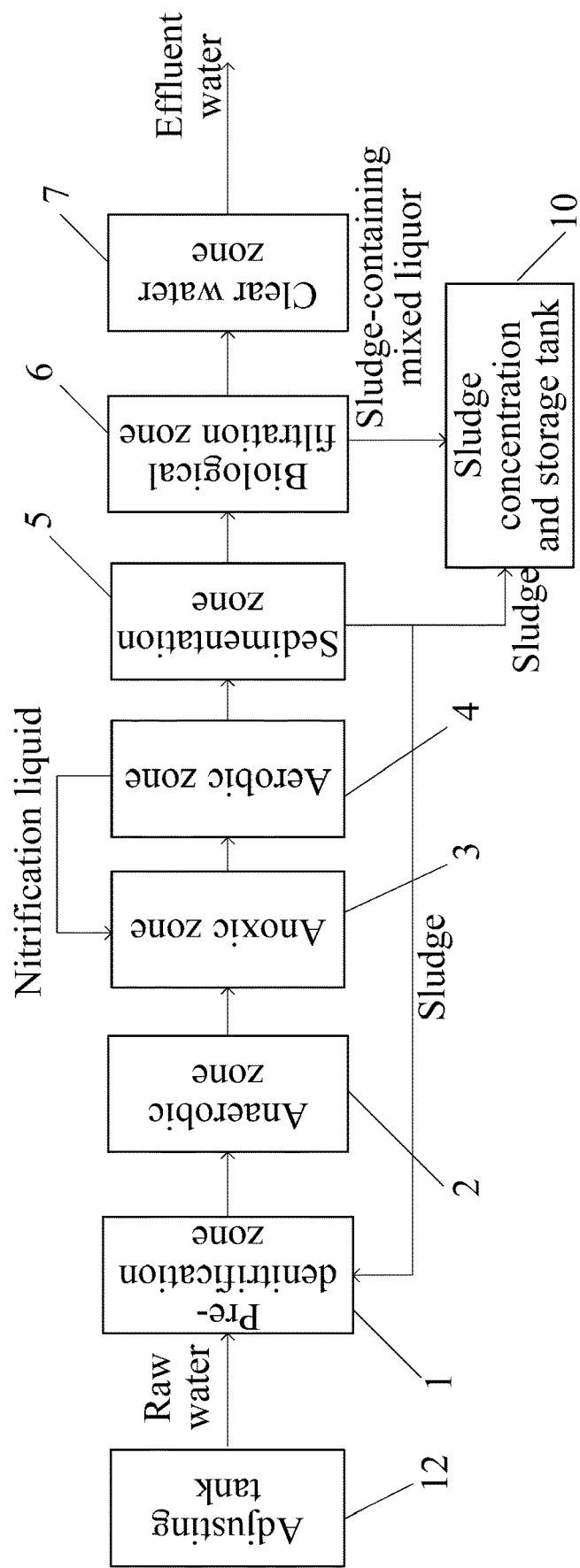
FIG. 3 is a process flow chart of the device for advanced nitrogen and phosphorus removal in sewage treatment provided by the present disclosure, where a sludge-containing mixed liquor obtained after backwash in the biological filtration zone flows through the backwash water outlet to the sludge concentration and storage tank.
Figure 4:
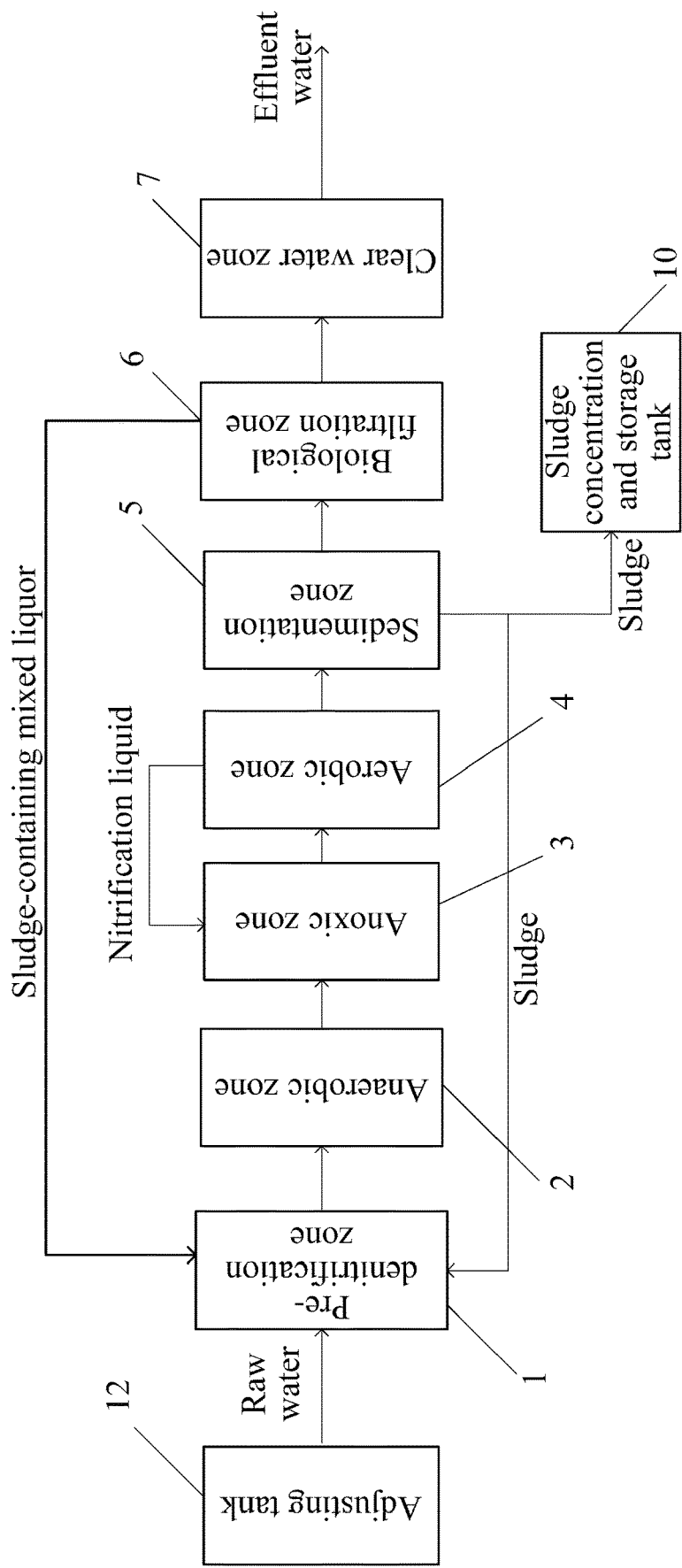
FIG. 4 is another process flow chart of the device for advanced nitrogen and phosphorus removal in sewage treatment provided by the present disclosure, where a sludge-containing mixed liquor obtained after backwash in the biological filtration zone flows through the backwash water outlet to the pre-denitrification zone.

Exemplarily, as shown in FIG. 1 and FIG. 2, the sludge return system 8 may include a return channel 81; a sludge outlet end 812 of the return channel 81 may be connected to the pre-denitrification zone 1, and a sludge inlet end 811 of the return channel 81 may be connected to the sedimentation zone 5; and the return channel 81 may be a U-shaped flat groove that is horizontally erected on tops of the pre-denitrification zone 1, the anaerobic zone 2, the anoxic zone 3, the aerobic zone 4, and the sedimentation zone 5. Due to small height and large width of the U-shaped flat groove, this design can effectively reduce a height of the entire device and increase an effective volume for sludge delivery, resulting in high efficiency, uneasy blockage, and convenient laying. Moreover, an upper surface of the U-shaped flat groove is flat, which can provide an effective support for a reversible door cover at the top of the device.

Figure 6:
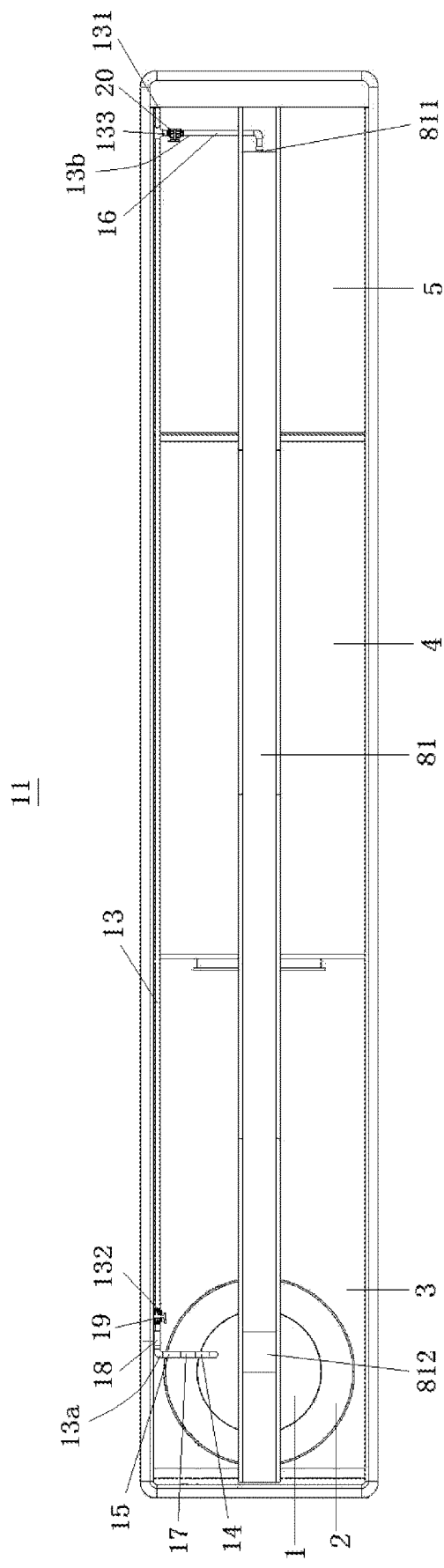
FIG. 6 is a first schematic structural diagram of the water inlet system, which shows the arrangement 1) of the water inlet position of the pipeline.
Figure 8:
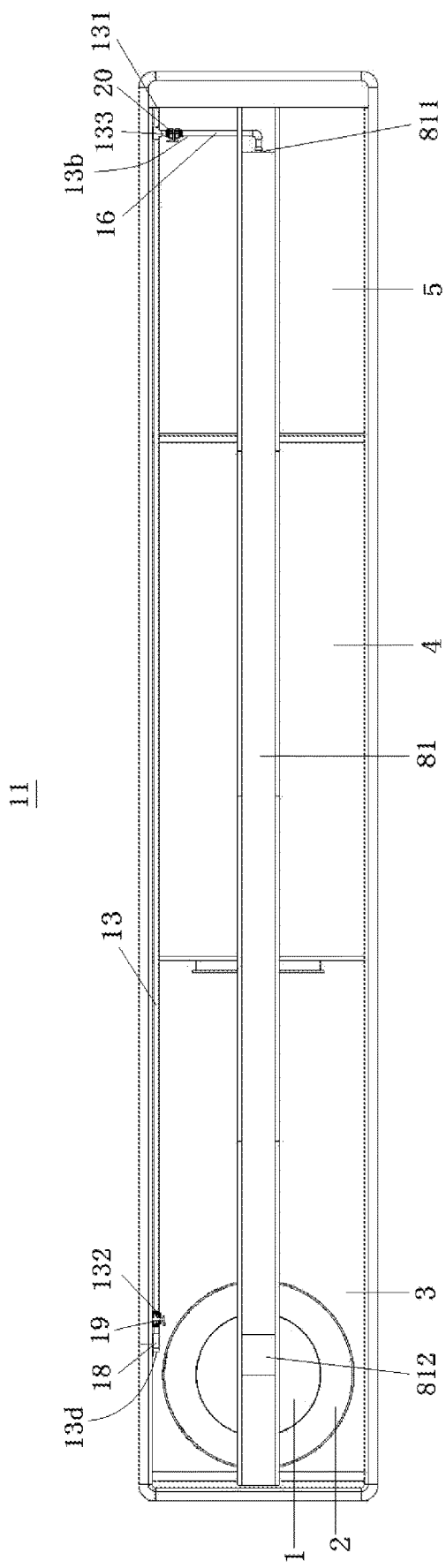
FIG. 8 is a third schematic structural diagram of the water inlet system, which shows the arrangement 3) of the water inlet position of the pipeline.

Exemplarily, as shown in FIG. 6 and FIG. 8, the device for advanced nitrogen and phosphorus removal in sewage treatment may further include a water inlet system 11; the water inlet system 11 may include a water inlet main pipe 13, a first connecting pipe 14, a second connecting pipe 15, a third connecting pipe 16, a first straight union connector 17, and a second straight union connector 18; a water inlet end 131 of the water inlet main pipe 13 may be connected to an adjusting tank 12 (lift pump outlet pipe).

Figure 7:
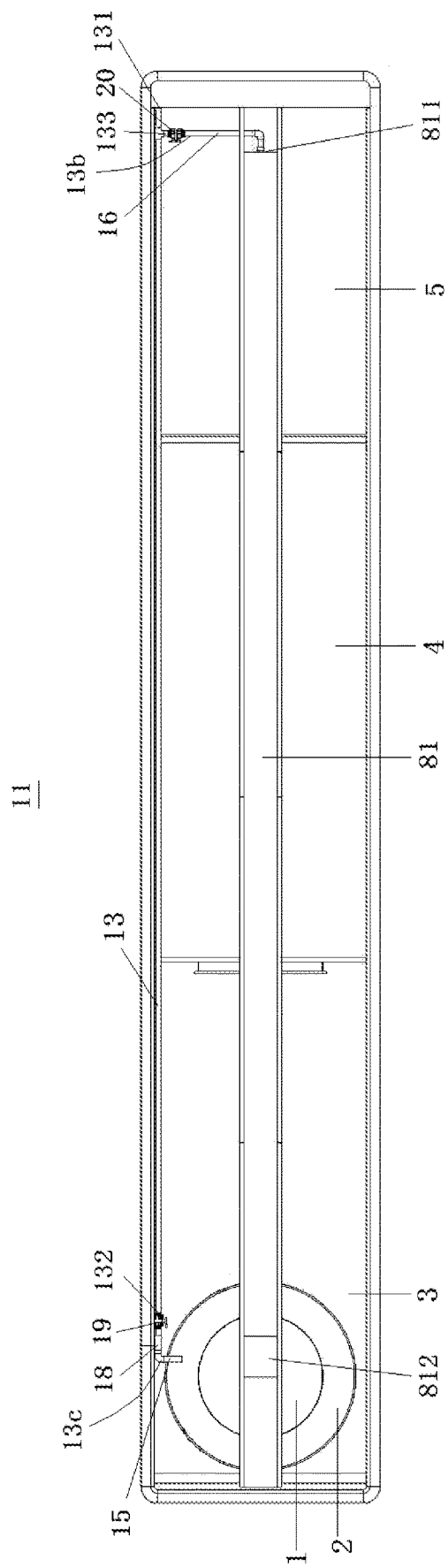
FIG. 7 is a second schematic structural diagram of the water inlet system, which shows the arrangement 2) of the water inlet position of the pipeline.

According to a water quality of raw water, a water inlet position of a pipeline may be adjusted specifically based on the following three arrangements:

1) as shown in FIG. 6, a first water outlet end 132 of the water inlet main pipe 13, the second straight union connector 18, the second connecting pipe 15, the first straight union connector 17, and the first connecting pipe 14 are connected in sequence to form a first water inlet channel 13a communicating with the pre-denitrification zone 1; a second water outlet end 133 of the water inlet main pipe 13 and the third connecting pipe 16 are connected in sequence to form a second water inlet channel 13b communicating with the sludge inlet end 811 of the return channel 81; and the sludge outlet end 812 of the return channel 81 communicates with the pre-denitrification zone 1;

2) as shown in FIG. 7, the first water outlet end 132 of the water inlet main pipe 13, the second straight union connector 18, and the second connecting pipe 15 are connected in sequence to form a third water inlet channel 13c communicating with the anaerobic zone 2; the second water outlet end 133 of the water inlet main pipe 13 and the third connecting pipe 16 are connected in sequence to form the second water inlet channel 13b communicating with the sludge inlet end 811 of the return channel 81; and the sludge outlet end 812 of the return channel 81 communicates with the pre-denitrification zone 1; and 3) as shown in FIG. 8, the first water outlet end 132 of the water inlet main pipe 13 and the second straight union connector 18 are connected in sequence to form a fourth water inlet channel 13d communicating with the anoxic zone 3; the second water outlet end 133 of the water inlet main pipe 13 and the third connecting pipe 16 are connected in sequence to form the second water inlet channel 13b communicating with the sludge inlet end 811 of the return channel 81; and the sludge outlet end 812 of the return channel 81 communicates with the pre-denitrification zone 1.

A first valve 19 may be provided at the first water outlet end 132 of the water inlet main pipe 13, and a second valve 20 may be provided at the second water outlet end 133 of the water inlet main pipe 13.

Therefore, when the water inlet system 11 is working, according to a quality of raw water, the water inlet position of the pipeline can be adjusted in time: (1) When the first valve 19 is opened and the second valve 20 is closed, water is output completely through the first water outlet end 132 of the water inlet main pipe 13, such that influent water of the system can enter the pre-denitrification zone 1 completely through the first water inlet channel 13a and the influent water of the system and the return sludge to flow separately, which makes it easy to control the sewage treatment system. (2) When the second valve 20 is opened and the first valve 19 is closed, water is output completely through the second water outlet end 133 of the water inlet main pipe 13, such that influent water of the system can enter the pre-denitrification zone 1 completely through the return channel 81 and a return sludge concentration can be reduced to prevent the sludge from blocking the return channel 81. (3) When both the first valve 19 and the second valve 20 are opened, according to a quality of raw water, a ratio of a water intake of the third water inlet channel 13c to a water intake of the second water inlet channel 13b can be adjusted to adjust a ratio of a water intake of the anaerobic zone 2 to a water intake of the pre-denitrification zone 1, which can allocate a carbon source and improve the total nitrogen removal efficiency. (4) When both the first valve 19 and the second valve 20 are opened, according to a quality of raw water, a ratio of a water intake of the fourth water inlet channel 13d to a water intake of the second water inlet channel 13b can be adjusted to adjust a ratio of a water intake of the anoxic zone 3 to a water intake of the pre-denitrification zone 1, which can allocate a carbon source and improve the total nitrogen removal efficiency. It can be seen that the above-mentioned water inlet system 11 can adjust the water inlet position of the pipeline in time according to a quality of raw water to adjust a water intake ratio of different zones, which helps to improve the stability of device operation and a quality of effluent water. The design of straight union connector can achieve a sealing effect, is convenient for assembly and disassembly, makes it easy to switch to a different water inlet channel, and helps to adjust the water inlet position of the pipeline and improve the efficiency.

Figure 9:
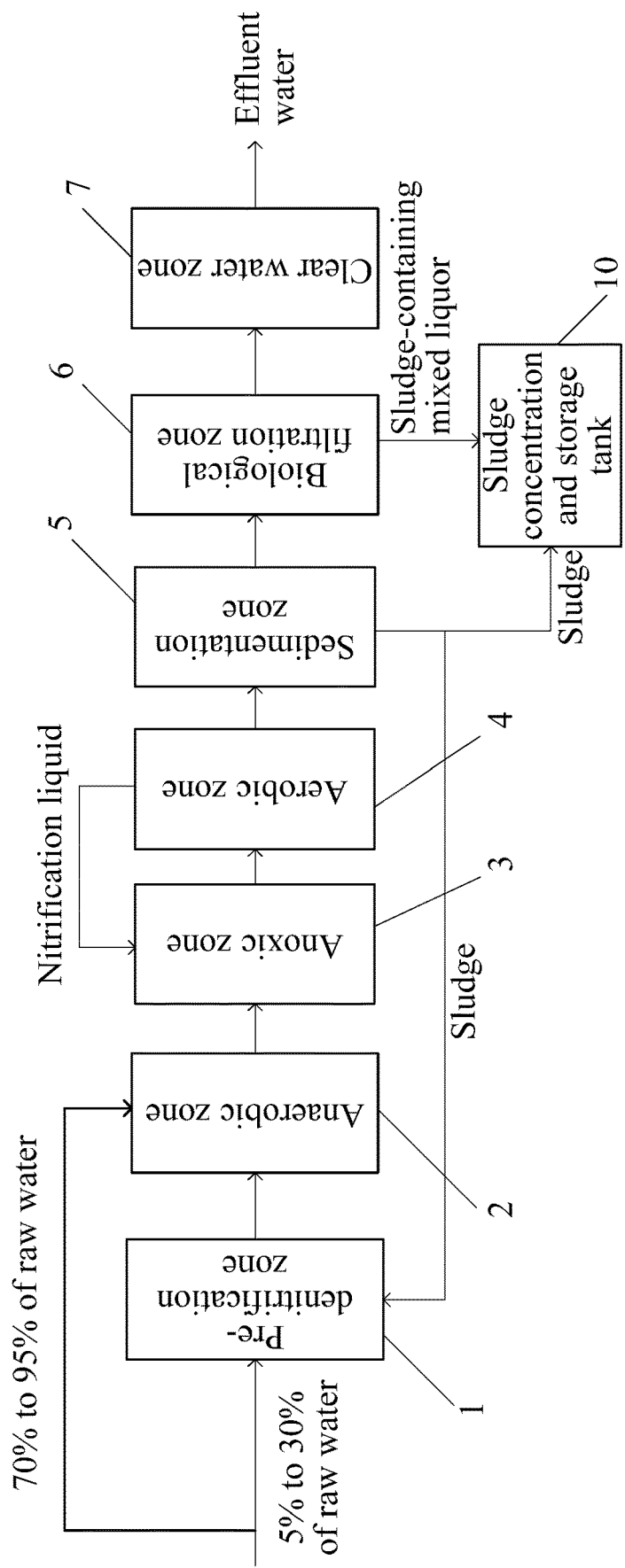
FIG. 9 is a process flow chart of the device for advanced nitrogen and phosphorus removal in sewage treatment provided by the present disclosure, where step feed is adopted for the pre-denitrification zone and the anaerobic zone.
Figure 10:
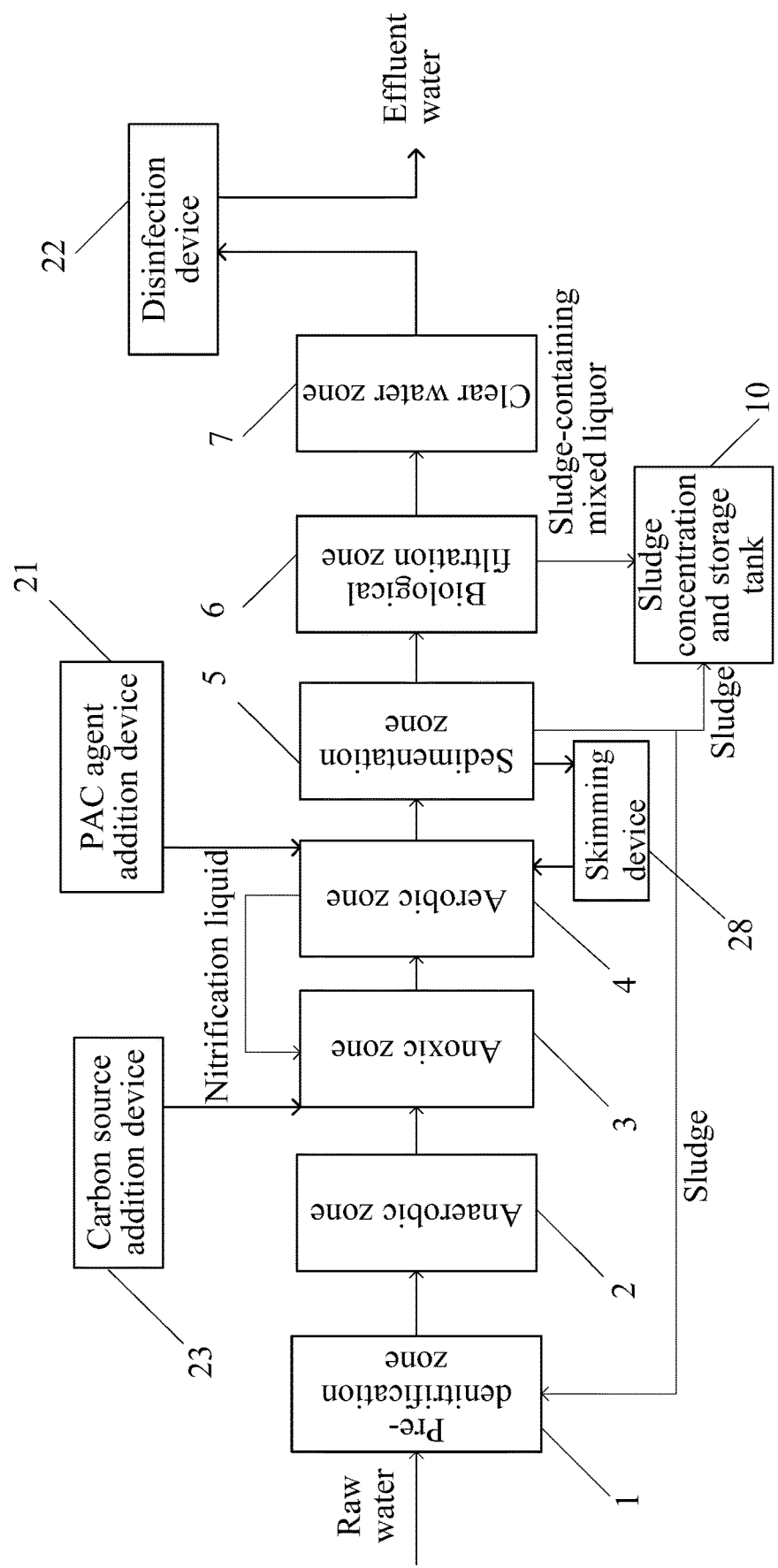
FIG. 10 is a process flow chart of the device for advanced nitrogen and phosphorus removal in sewage treatment provided by the present disclosure, where a carbon source addition device, a PAC agent addition device, a disinfection device, and an air-stripping skimming device are added to the device.

Exemplarily, as shown in FIG. 7 and FIG. 9, when the water inlet position of the pipeline is in arrangement 2), in order to clarify the functional division of the pre-denitrification zone 1 and the anaerobic zone 2, according to a quality of influent water, one part of the raw water (accounting for 5% to 30% of the total raw water fed) enters the pre-denitrification zone 1, and the organic matters in the raw water undergo complete denitrification with nitrate nitrogen in sludge returned from the sedimentation zone 5 to the pre-denitrification zone 1 to provide sufficient carbon source; and the other part of the raw water (accounting for 70% to 95% of the total raw water fed) enters the anaerobic zone 2 and is mixed with the sludge-containing mixed liquor obtained after the denitrification in the pre-denitrification zone 1 for biological phosphorus removal, which can provide sufficient carbon source for PAOs without affecting the phosphorus removal effect. As a result, based on the above-mentioned step feed arrangement, for sewage with low C/N and C/P ratios, the total phosphorus removal efficiency can be increased from about 80% to about 90%, and the total nitrogen removal efficiency can be increased by about 5% and approach 80%, indicating a remarkable effect.

Figure 11:
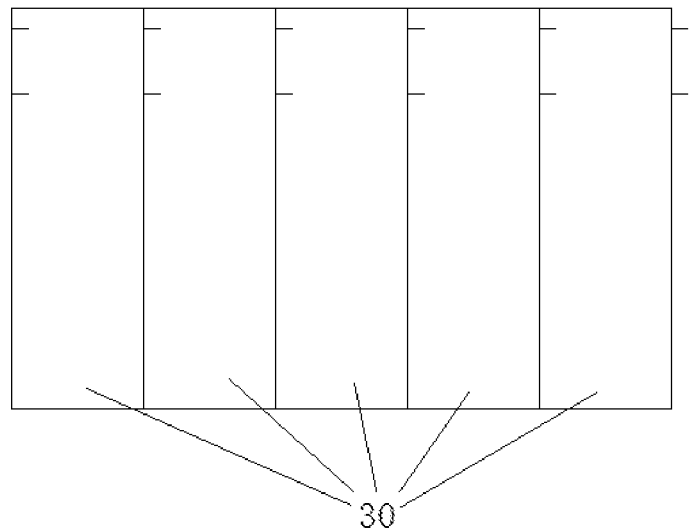
FIG. 11 is a schematic structural diagram of the anoxic zone.
Figure 12:
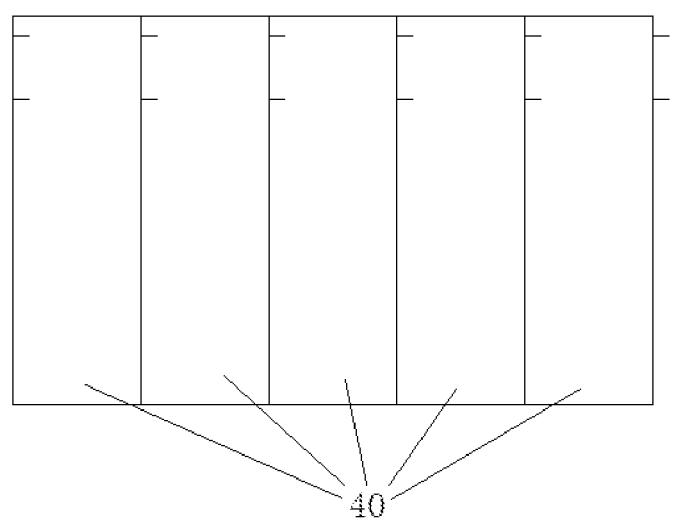
FIG. 12 is a schematic structural diagram of the aerobic zone.

Exemplarily, in order to arbitrarily change a ratio of the anoxic zone 3 to the aerobic zone 4 to adapt to influent water qualities of different regions and discharge standards of different regions, the anoxic zone 3 may be composed of at least one anoxic tank 30, and if there are two or more anoxic tanks, the two or more anoxic tanks may communicate with each other in sequence (as shown in FIG. 11); and the aerobic zone 4 may be composed of at least one aerobic tank 40, and if there are two or more aerobic tanks, the two or more aerobic tanks may communicate with each other in sequence (as shown in FIG. 12).

Exemplarily, as shown in FIG. 9, a PAC agent addition device 21 may be provided at a tail end of the aerobic zone 4 to enhance the nitrification effect in winter and enable effluent water of high total phosphorus influent water to meet standards stably.

Exemplarily, as shown in FIG. 9, in order to kill harmful pathogenic microorganisms in effluent water and make discharged water meet discharge standards, a disinfection device 22 may be provided at a tail end of the clear water zone 7. In this example, the disinfection device 22 adopts a tablet disinfection process or an ultraviolet (UV) disinfection process.

Exemplarily, as shown in FIG. 9, a carbon source addition device 23 may be provided at a head end of each of the pre-denitrification zone 1, the anaerobic zone 2, and the anoxic zone 3 to facilitate the supplementation of a carbon source and ensure the stable operation of the device.

Figure 5:
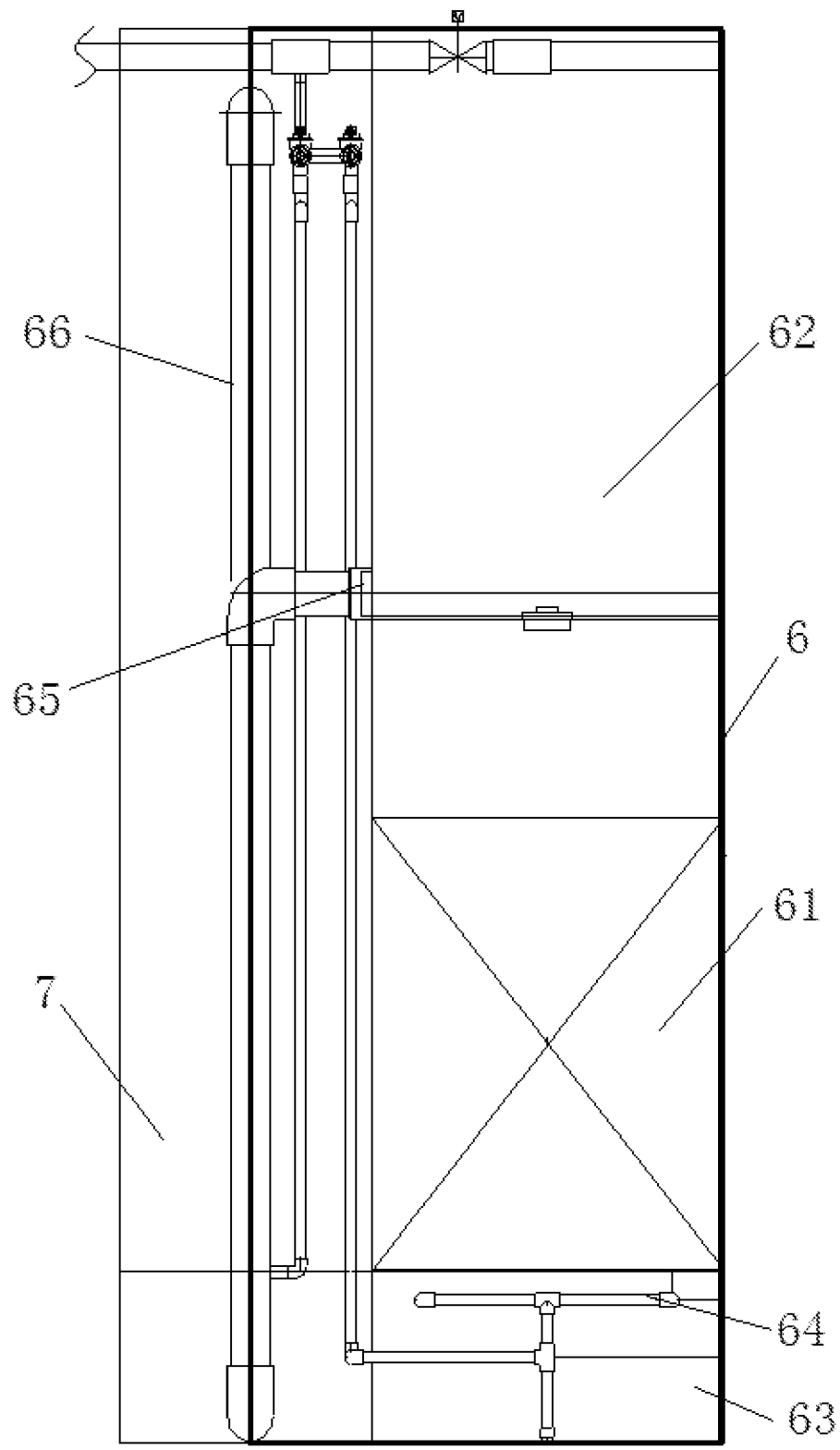
FIG. 5 is a schematic structural diagram of the biological filtration zone.

Exemplarily, as shown in FIG. 5, the backwash water outlet 65 should be close to an upper surface of the filler layer 61, such that sludge and impurities resulting from the backwash can be completely discharged.

Exemplarily, the filler in the filler layer 61 of the biological filtration zone 6 may preferably be a soft filler, such as a sponge. The soft filler has light weight and high hydrophilicity, will be fluidized with water, and is not easy to form a dead zone, and perforated aeration of the backwash aeration pipe 64 can make the soft filler fully stirred. Moreover, under the action of a gas, a mud-water mixture in the soft filler can be squeezed out to complete the separation of the mud-water mixture and the filler, then the soft filler is fixed in the filler filling zone, and the mud-water mixture is returned to the pre-denitrification zone 1 or the sludge concentration and storage tank through the air stripping device, thereby achieving the cleaning of the soft filler. Compared with a hard filler (such as a plastic particle), the soft filler has a better cleaning effect and involves low energy consumption. In addition, the soft filler also has excellent biological affinity and a wall structure to provide a huge surface area and high SS adsorption capacity, and thus the use of a sponge filler to adsorb suspended matters in effluent water from the sedimentation tank can effectively remove SS and make SS in the effluent water stably less than 10 mg/L. Moreover, the sponge is conducive to the growth of aerobic microorganisms, which can further remove organic matters and ammonia nitrogen, such that a $COD_{cr}$ value of effluent water is stably less than 30 mg/L and an ammonia nitrogen value of effluent water is stably less than 1 mg/L, thereby meeting the discharge standards of surface water IV.

In this example, the sponge may preferably be a polyurethane (PU) sponge, which may be a cube with a side length of 0.1 cm to 3 cm. In other examples, the filler in the filler layer 61 of the biological filtration zone 66 can also be a hard filler, such as a plastic particle (PP); and the plastic particle may be a cylinder with a diameter of 0.1 cm to 3 cm and a height of 0.1 cm to 5 cm or may be a cuboid with a side length of 0.1 cm to 3 cm. Further, a height of the filler layer 61 may account for 20% to 70% of a height of the biological filtration zone 6.

Exemplarily, a solenoid valve may be provided at an air inlet end of the backwash aeration pipe 64. The solenoid valve is provided to control a switch of the backwash aeration pipe 64; and the backwash may be conducted 1 to 5 times per day.

Figure 13:
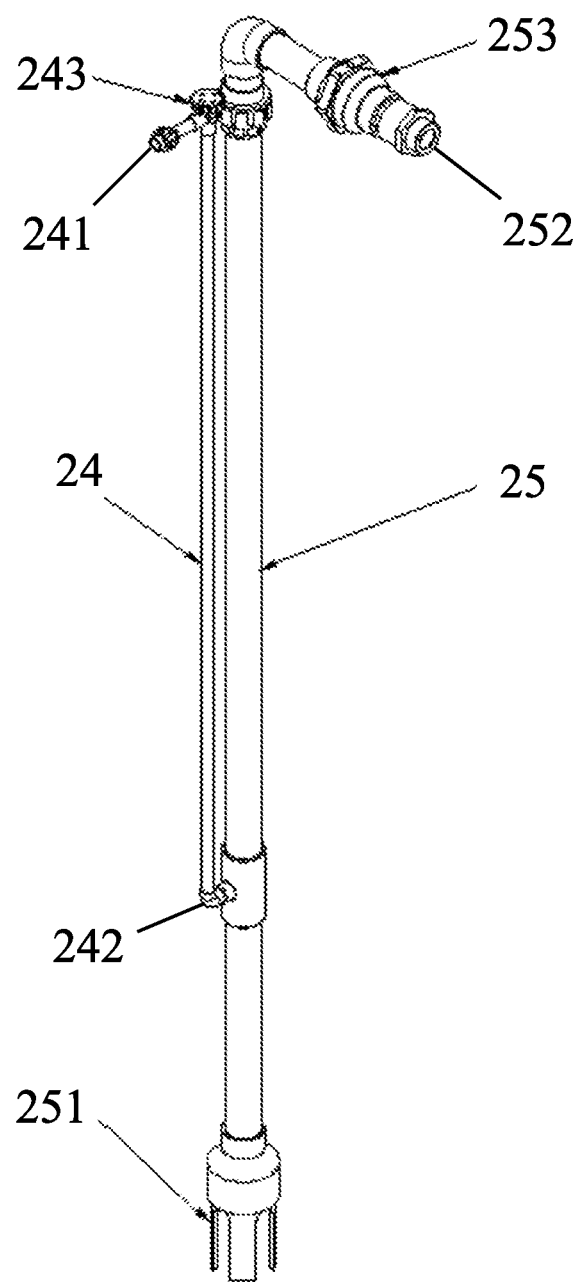
FIG. 13 is a schematic structural diagram of the air stripping device.

Exemplarily, as shown in FIG. 5, the backwash water outlet 65 may be connected to the sludge concentration and storage tank 10 or the pre-denitrification zone 1 through a first air stripping device 66; the sludge return system 8 may further include a second air stripping device 82, and the second air stripping device 82 can return the sludge in the sedimentation zone 5 to the pre-denitrification zone 1 through air stripping; and the nitrification liquid return system 9 may include a third air stripping device 91, and the third air stripping device 91 can return the nitrification liquid in the aerobic zone 4 to the anoxic zone 3. In this example, as shown in FIG. 13, each of the above-mentioned air stripping devices (66, 82, 91) may include an air supply pipe 24 and an air stripping pipe 25; the air supply pipe 24 may have an air inlet 241 and an air outlet 242; the air inlet 241 may be connected to an air pump or a fan, and the air outlet 242 may be connected to the air stripping pipe 25; the air supply pipe 24 may be provided with a solenoid valve 243 for controlling the open/close of the air supply pipe 24; the air stripping pipe 25 may have a suction port 251 and a discharge port 252; the suction port 251 may communicate with a corresponding sending-out functional zone (such as the backwash water outlet 65 of the biological filtration zone 6, the sedimentation zone 5, and the aerobic zone 4), and the discharge port 252 may communicate with a corresponding receiving functional zone (such as the sludge concentration and storage tank 10, the pre-denitrification zone 1, and the anoxic zone 3) through a flow channel; and a check valve 253 may be provided at the air stripping pipe 25. When the air stripping device is in operation, the solenoid valve 243 is opened, and air enters the air stripping pipe 25 through the air supply pipe 24, such that a liquid density inside the air stripping pipe 25 is smaller than that outside the air stripping pipe 25, and a water pressure inside the air stripping pipe 25 is lower than that outside the air stripping pipe 25; and under the action of a water pressure difference between the inside and outside of the air stripping pipe 25, a flowing medium in a sending-out functional zone is pressed into the air stripping pipe 25 and then discharged into a receiving functional zone through a flow channel. After the operation is completed, the solenoid valve 243 is closed to block air from entering the air stripping pipe 25, such that a water pressure difference between the inside and outside of the air stripping pipe 25 disappears and the sludge discharge is stopped. The open/close of the air supply pipe 24 is controlled by the solenoid valve 243 on the air supply pipe 24, thereby controlling the open/close of the air stripping pipe 25. A medium flowing through the valve and the air pump that provides a gas for the air supply pipe 24 is a gas, which will not directly contact the sludge, is not easy to be damaged, and has a long service life and a low cost. Moreover, the check valve 253 is provided on the air stripping pipe 25 to effectively prevent a flowing medium from flowing back to the sending-out functional zone.

Figure 14:
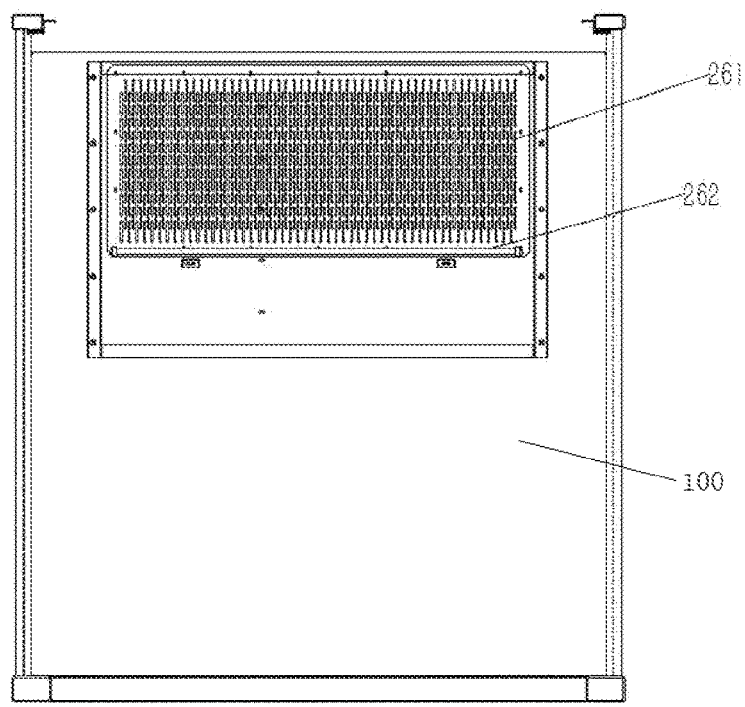
FIG. 14 is a schematic structural diagram of the filler intercepting grid device.

Exemplarily, as shown in FIG. 1 and FIG. 2, a top of a partition wall 100 between the anoxic zone 3 and the aerobic zone 4 may be provided with a water baffle 27, such that a liquid level in the anoxic zone 3 is higher than a liquid level in the aerobic zone 4 to form a liquid level difference and thus water in the anoxic zone 3 can flow into the aerobic zone 4 under gravity. A top of a partition wall 100 between the aerobic zone 4 and the sedimentation zone 5 may be provided with a filler intercepting grid device 26. Specifically, as shown in FIG. 14, the filler intercepting grid device 26 may include a grid 261 for intercepting a filler and fiber debris in the aerobic zone 4 and a first aeration pipe 262 for flushing the filler and the fiber debris on the grid 261; the grid 261 may be partly above a liquid level in the aerobic zone 4; a water inlet side of the grid 261 may face towards the aerobic zone 4, and a water outlet side of the grid 261 may face towards the sedimentation zone 5; and at least one first aeration pipe 262 may be provided below the grid 261 and close to the water inlet side of the grid. In the design of the filler intercepting grid device 26, a large-area grid is directly provided on the partition wall. On the one hand, the grid can effectively intercept the fluidized filler and fiber debris in the aerobic zone 4, and on the other hand, filter holes of the grid can effectively reduce a flow rate of water, which can buffer an impact strength of a water flow flushing the sedimentation zone from the aerobic tank, and thus prevents sludge in the sedimentation tank from being upturned and water in the sedimentation tank from becoming turbid due to excessive impact of a water flow. With the aeration mechanism, the filler and fiber debris adhering to the grid can be effectively flushed, such that the filler and fiber debris are not easy to adhere to the grid, which prevents the filler and fiber debris from accumulating on the grid and thus effectively avoids unsmooth flow and blockage of the grid. It can be seen that the present disclosure involves simple structure and convenient installation, can effectively intercept the filler and limit the flow rate, and can avoid unsmooth flow and blockage.

Exemplarily, as shown in FIG. 1 and FIG. 2, a second aeration pipe 41 may be provided in the aerobic zone 4, which is provided to aerate a reaction tank to ensure dissolved oxygen required for the aerobic metabolism of microorganisms and maintain the mixing and material transfer in the reactor, thereby providing necessary conditions for the cultivation of microorganisms.

Exemplarily, a filler, such as a sponge, a plastic particle, or a fiber rope, may be filled in the anoxic zone 3. The sponge may preferably be a PU sponge, which may be a cube with a side length of 0.5 cm to 5 cm; the plastic particle may preferably be a polypropylene (PP) particle, which may be a cylinder with a diameter of 0.5 cm to 3 cm and a height of 0.5 cm to 5 cm or may be a cuboid with a side length of 0.5 cm to 5 cm; the fiber rope may be a group of looped filaments made of a synthetic material such as polyvinyl chloride (PVC), pp, and modified fiber, where with a string as a center, filaments are arranged radially to form a 3D rope-like structure; and the fiber rope may have specified rigidity and flexibility, a relative mass generally of 0.91 to 1.0, a diameter of 20 mm to 60 mm, and a surface area of 100 $m^2/m$ to 190 $m^2/m$. The arrangement of the sponge, plastic particle, or fiber rope provides an excellent carrier for the growth of microorganisms, accelerates the growth of microorganisms, increases a denitrification rate in the anoxic zone 3, and reduces a tank volume.

Exemplarily, a filler, such as a sponge, a plastic particle, or a fiber rope, may be filled in the aerobic zone 4. The sponge may preferably be a PU sponge, which may be a cube with a side length of 0.5 cm to 5 cm; the plastic particle may preferably be a PP particle, which may be a cylinder with a diameter of 0.5 cm to 3 cm and a height of 0.5 cm to 5 cm or may be a cuboid with a side length of 0.5 cm to 5 cm; the fiber rope may be a group of looped filaments made of a synthetic material such as PVC, pp, and modified fiber, where with a string as a center, filaments are arranged radially to form a 3D rope-like structure; and the fiber rope may have specified rigidity and flexibility, a relative mass generally of 0.91 to 1.0, a diameter of 20 mm to 60 mm, and a surface area of 100 $m^2/m$ to 190 $m^2/m$. The arrangement of the sponge, plastic particle, or fiber rope provides an excellent carrier for the growth of microorganisms, accelerates the growth of microorganisms, increases a denitrification rate in the aerobic zone 4, and reduces a tank volume. In this example, a ratio of a volume of the filler in the aerobic zone 4 to a volume of the aerobic zone 4 may be 0.2 to 0.6.

Figure 15:
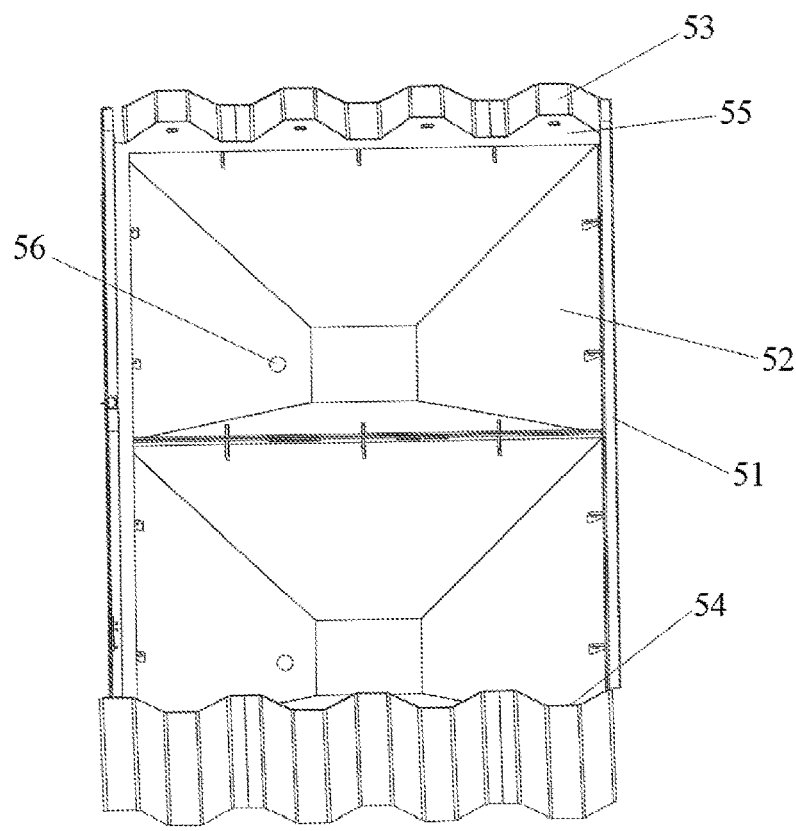
FIG. 15 is a schematic structural diagram of the sedimentation zone.

Exemplarily, as shown in FIG. 15, the sedimentation zone 5 may be provided with a water storage tank 51 and a plurality of sludge buckets 52; each side wall of the water storage tank 51 may be a corrugated plate 53; the plurality of sludge buckets 52 may be arranged side by side at a bottom of the water storage tank 51; a connecting plate 55 may be provided between a recess 54 of the corrugated plate and a top of the sludge bucket 52; a shape of the connecting plate 55 may match a shape of the recess 54 of the corrugated plate, and the connecting plate 55 may be inclined downwards from the corrugated plate 53 to the sludge bucket 52; the water storage tank 51, the sludge bucket 52, and the connecting plate 55 may be each coated with an anti-corrosive paint; and the sludge bucket 52 may have an inverted cone structure. There may be a removable structure between the sludge bucket 52 and the water storage tank 51 or between the sludge bucket 52 and the sludge bucket 52, which reduces the difficulty of manufacturing of the water storage tank 51 and the sludge bucket 52 and the difficulty of spray-coating of an anti-corrosive paint, and can realize the standardized production of the sedimentation tank. Moreover, the water storage tank 51 and the sludge bucket 52 can be coated with different anti-corrosive paints for anticorrosion, which reduces a production cost. The sludge bucket 52 is fixed to the water storage tank 51 through the connecting plate 55. Because the connecting plate 55 is arranged obliquely and matches a shape of the recess 54 of the corrugated plate of the box body, sewage to be settled that enters from the upper part of the water storage tank 51 can be guided into the sludge bucket 52 through the connecting plate 55, and the sewage to be settled can be prevented from flowing into the tank from the recess on the corrugated plate 53 and affecting the collection of sludge. The side wall of the water storage tank 51 may be a corrugated plate 53, which can improve the pressure bearing capacity of the sedimentation zone 5. In addition, a water inlet 56 may be formed at a lower part of the side wall of the water storage tank 51, such that water at the bottom of the water storage tank 51 can enter the sludge bucket 52 through the water inlet 56 on the water storage tank 51, which prevents the sludge bucket 52 from being floated due to stagnant water at the bottom of the water storage tank 51, reduces a design structural strength of the sludge bucket 52, and reduces a cost. The sludge bucket 52 may be made of pp or stainless steel to improve the anti-corrosive effect of the sludge bucket 52.

Figure 16:
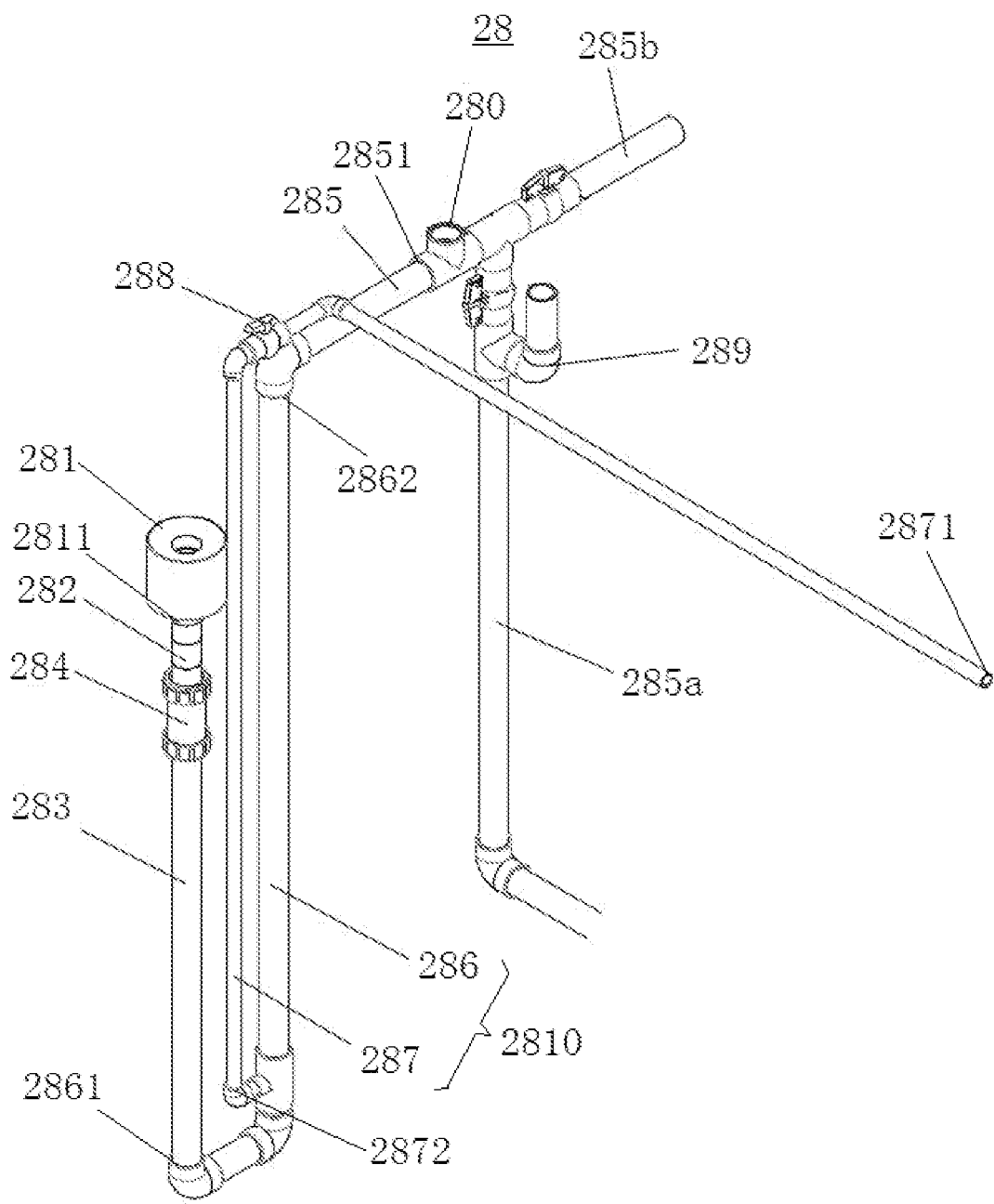
FIG. 16 is a schematic structural diagram of the air-stripping skimming device.

Exemplarily, as shown in FIG. 16, the sedimentation zone 5 may be provided with an air-stripping skimming device 28; the air-stripping skimming device 28 may include a skimmer 281, a first vertical pipe 282, a second vertical pipe 283, an expansion joint 284, an air-stripping mechanism 2810, and an output main pipe 285; the skimmer 281 may be suspended above a liquid surface in the sedimentation zone 5; a scum outlet end 2811 of the skimmer 281 may be connected to an upper end of the first vertical pipe 282, a lower end of the first vertical pipe 282 may be connected to an upper end of the expansion joint 284, a lower end of the expansion joint 284 may be connected to an upper end of the second vertical pipe 283, a lower end of the second vertical pipe 283 may be connected to the output main pipe 285 through the air-stripping mechanism 2810, and an output end 2851 of the output main pipe 285 may be connected to an adjusting tank 12 outside the device or a front end zone (such as aerobic zone 4) inside the device. With the expansion joint 284, a nut can be loosened to adjust a skimming pipe to a desired height, and then the nut can be tightened to lock a length of the expansion joint, such that a height of the skimmer 281 can be adjusted according to a height of a liquid level, which greatly expands a use scope of the skimmer 281, realizes convenient adjustment and wide adjustment range, and allows the skimming device to have a simple structure and reliable maintenance.

Exemplarily, as shown in FIG. 16, the air-stripping mechanism 2810 of the air-stripping skimming device 28 may include a scum discharge pipe 286 and an air supply pipe 287; a scum inlet end 2861 of the scum discharge pipe 286 may be connected to the lower end of the second vertical pipe 283, and a scum outlet end 2862 of the scum discharge pipe 286 may be connected to the output main pipe; the air supply pipe 287 may have an air inlet 2871 and an air outlet 2872; the air inlet 2871 may be connected to an air pump, and the air outlet 2872 may be connected to the scum discharge pipe 286; and the air supply pipe 287 may be provided with a valve 288. Specifically, the valve may include a solenoid valve (not shown in the figure) for controlling the open/close of the air supply pipe 287 and a manual valve for adjusting a gas volume of the air supply pipe 287. When in use, a solenoid valve is opened, and air enters the scum discharge pipe 286 through the air supply pipe 287, such that a liquid density inside the scum discharge pipe 286 is smaller than that outside the scum discharge pipe 286, and a water pressure inside the scum discharge pipe 286 is lower than that outside the scum discharge pipe 286; and under the action of a water pressure difference between the inside and outside of the scum discharge pipe 286, a scum in the sedimentation tank is sucked into the scum discharge pipe 286 and then discharged into a front end zone in the sewage treatment system through the output main pipe. After the use is completed, the solenoid valve is closed to block air from entering the scum discharge pipe 286, such that a water pressure difference between the inside and outside of the scum discharge pipe 286 disappears and the scum discharge is stopped. The open/close of the air supply pipe 287 is controlled by the solenoid valve on the air supply pipe 287, thereby controlling the open/close of the scum discharge pipe 286. A medium flowing through the valve 288 and the air pump that provides a gas for the air supply pipe 287 is a gas, which will not directly contact the scum, is not easy to be damaged, and has a long service life and a low cost.

It should be noted that, as shown in FIG. 16, the output end 2851 of the output main pipe 285 may be connected to a first output pipe 285a leading to an adjusting tank 12 outside the system device and a second output pipe 285b leading to a front end zone (such as aerobic zone 4) inside the system device through a three-way connection. With this design, when a scum is returned to a front end zone (such as aerobic zone 4) of the system device, microorganisms in the aerobic tank can be used to repeatedly degrade dead sludge in the scum, which can reduce a cleaning frequency of the adjusting tank 12 compared with the manner of discharging the scum to the adjusting tank; and when a scum is returned to the adjusting tank 12 outside the system device, the scum will re-enter the system device and undergo anaerobic treatment, anoxic treatment, aerobic treatment, and the like, which further improves the treatment effect of the system.

Further, as shown in FIG. 16, the first output pipe 285a and the second output pipe 285b may be each provided with a ball valve, which can control the discharge of sewage to the adjusting tank 12 outside the device or the front end zone inside the device, thereby well controlling the device.

Further, as shown in FIG. 16, an overflow pipe 289 may be connected to the first output pipe 285a, and a water outlet end of the overflow pipe 289 may be connected to the adjusting tank 12 outside the system device. When a water level in the sedimentation zone 5 is abnormal and exceeds an alert level, water in the sedimentation zone can overflow through the overflow pipe 289 to the adjusting tank 12, which can effectively prevent the device from overflow and improve the safety.

Further, as shown in FIG. 16, the output main pipe 285 may be provided with a three-way pipe 280 for observing a water flow rate of the output main pipe; the three-way pipe 280 may be arranged horizontally; and two horizontal interfaces of the three-way pipe 280 may be separately connected to the output main pipe 285 in series, and a vertical interface of the three-way pipe 280 may arranged upwards. As a result, with the design of the three-way pipe 280, the water volume for the scum discharge by air stripping can be conveniently and intuitively observed, such that the device can be controlled more reasonably.

Figure 17:
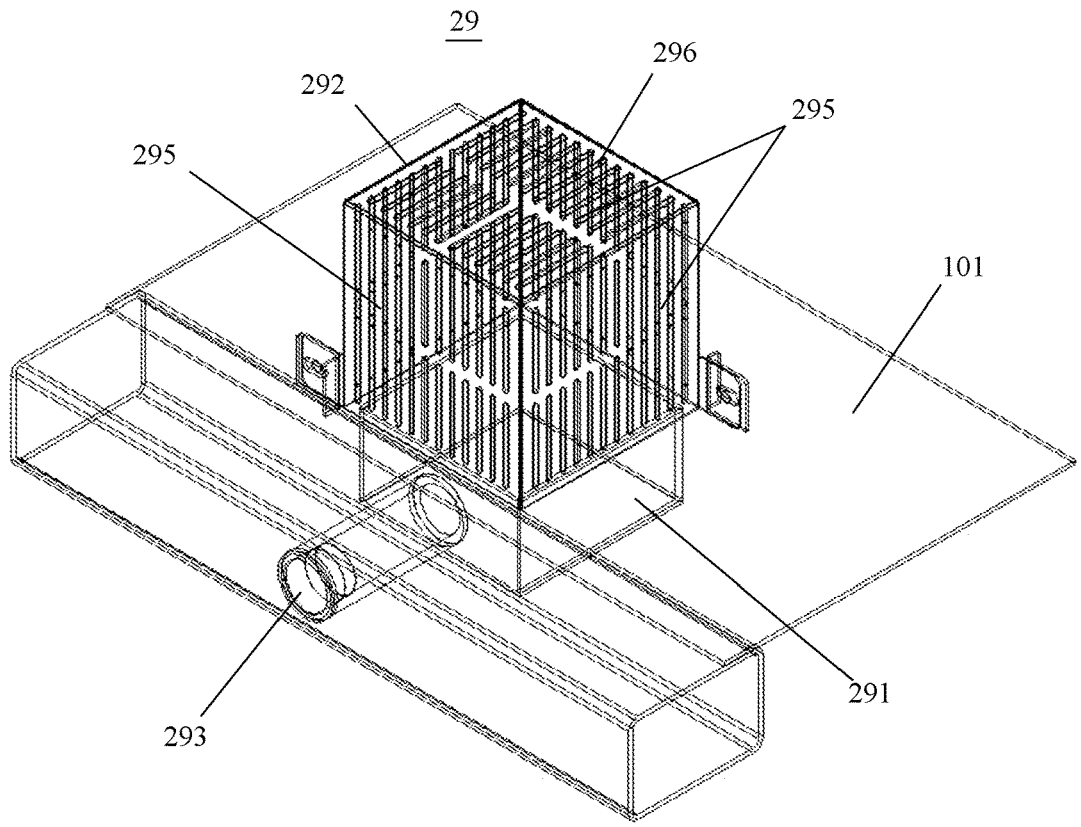
FIG. 17 is a schematic structural diagram of the emptying device.
Figure 18:
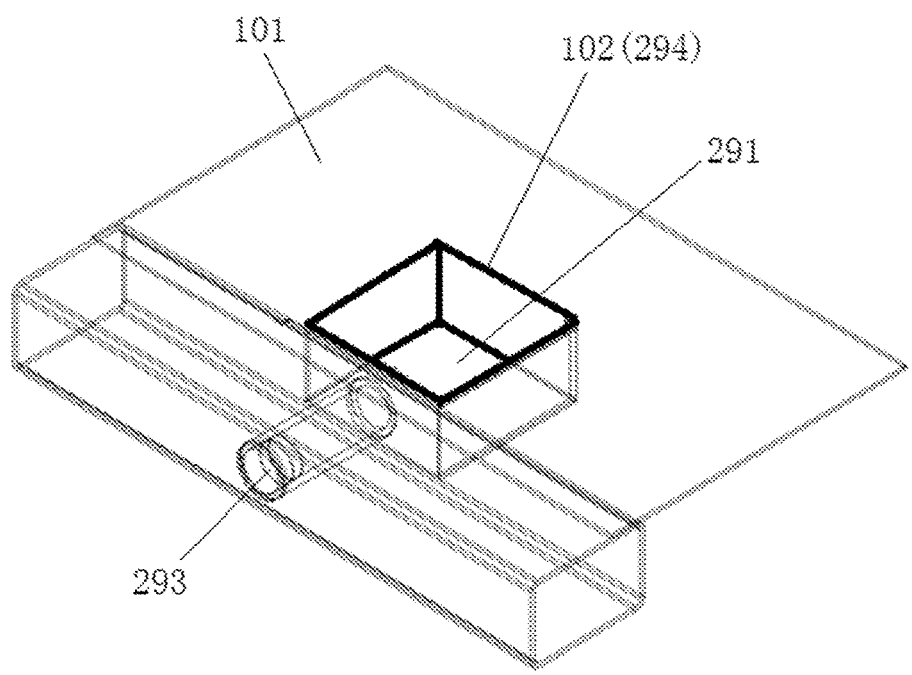
FIG. 18 is a schematic diagram of the structure shown in FIG. 17, where the filter screen is hidden.

Exemplarily, as shown in FIG. 17 and FIG. 18, the pre-denitrification zone 1, the anaerobic zone 2, the anoxic zone 3, the aerobic zone 4, the sedimentation zone 5, the biological filtration zone 6, and the clear water zone 7 may be each provided with a water storage tank; a drainage port 102 may be formed on a bottom plate 101 of the water storage tank, and an emptying device 29 may be provided at the drainage port 102; the emptying device 29 may include a drainage channel 291 and a filter screen 292; the drainage channel 291 may communicate with the drainage port 102 and may be fixedly arranged on an outer surface of the bottom plate; a notch 294 of the drainage channel 291 may match the drainage port 102; a side wall of the drainage channel 291 may be provided with a horizontally arranged drainage pipe 293; the filter screen 292 may have a 3D structure and cover above the drainage port 102; the filter screen 292 may be provided with a plurality of filter surfaces 295, and each of the plurality of filter surfaces 295 may be provided with a plurality of filter pores 296. Therefore, when emptying, a fluid in the tank can be completely discharged from the water storage tank through the drainage port 102, the drainage channel 291, and the drainage pipe 293 in sequence. The filter screen 292 has a 3D structure, and the plurality of filter surfaces 295 can simultaneously filter a fluid, which increases a filter area, is not prone to blockage, improves the filter efficiency, ensures smooth drainage, and involves a simple structure and a long service life.

It should be noted that the water storage tanks corresponding to the pre-denitrification zone 1, anaerobic zone 2, anoxic zone 3, aerobic zone 4, sedimentation zone 5, biological filtration zone 6, and clear water zone 7 are all formed by dividing the same tank body with the partition wall 100. Specifically, the pre-denitrification zone 1 and the anaerobic zone 2 may be arranged at a front end of the tank body; the anaerobic zone 2 may be located in an enclosed area for the anoxic zone 3, and the anaerobic zone 2 and the anoxic zone 3 may be separated by an annular partition wall; and the pre-denitrification zone 1 may be located in an enclosed area for the anaerobic zone 2, and the pre-denitrification zone 1 and the anaerobic zone 2 may be separated by an annular partition wall. The anoxic zone 3, the aerobic zone 4, the sedimentation zone 5, the biological filtration zone 6, and the clear water zone 7 may be arranged in sequence from the front to the back, and a device room may also be provided at a rear end of the tank body.

Exemplarily, the device may also be equipped with a climbing ladder and a telescopic ladder matching the climbing ladder, which is convenient for personnel to go up and down and prevents unrelated persons from going up and down at will.

Exemplarily, pneumatic gas sources of the first air stripping device 66, the second air stripping device 82, the third air stripping device 91, the backwash aeration pipe 64, the first aeration pipe 262, and the second aeration pipe 41 may be provided by the same air pump or fan, and may each be controlled by a corresponding airway valve.

For example, results of conventional $A^2O$ feed, conventional water feeding in an improved $A^2O$ ($A^3O$) process provided with a pre-denitrification zone, and $A^3O$ step feed are compared below:

$A^2O$ feed: water is completely fed from the anaerobic zone 2; conventional $A^3O$ feed: water is completely fed from the pre-denitrification zone 1; and $A^3O$ step feed: pre-denitrification zone 1/anaerobic zone 2=1/9, a water intake is about 30 m³/d. Experimental data are as follows:

TABLE 1

Comparison results of conventional $A^2O$ feed, conventional $A^3O$ feed, and $A^3O$ step feed

| Item | | Range for influent water (mg/L) | Mean value for influent water (mg/L) | Range for effluent water (mg/L) | Mean value for effluent water (mg/L) | Removal rate (%) |
|---|---|---|---|---|---|---|
| $COD_{cr}$ | $A^2O$ | 120-310 | 208 | 14-33 | 29 | 86.1% |
| | $A^3O$ conventional | 120-310 | 208 | 12-29 | 23 | 88.9% |
| | $A^3O$ step feed | 125-280 | 201 | 13-28 | 24 | 88.1% |
| TN | $A^2O$ | 40.1-55.3 | 51.1 | 13.6-17.5 | 16.3 | 68.1% |
| | $A^3O$ conventional | 40.1-55.3 | 51.1 | 12.4-15.9 | 14.5 | 71.6% |
| | $A^3O$ step feed | 41.5-58.2 | 55.1 | 10.9-14.6 | 12.8 | 76.8% |
| TP | $A^2O$ | 3.25-6.67 | 4.84 | 0.55-1.29 | 0.95 | 80.4% |
| | $A^3O$ conventional | 3.25-6.67 | 4.84 | 0.42-0.99 | 0.73 | 84.9% |
| | $A^3O$ step feed | 3.55-6.42 | 5.23 | 0.33-0.48 | 0.45 | 91.4% |

It can be seen from the above table that, compared with the $A^2O$ process, the $A^3O$ or $A^3O$ step feed process achieves significantly-improved TN and TP removal effects for sewage with low C/N and C/P ratios; and the $A^3O$ step feed process achieves a TN removal rate of 76.8% and a TP removal rate of 91.4%, indicating a remarkable effect.

For example, results obtained before and after a biological filtration zone 66 is added to the $A^3O$ process are compared below:

$A^3O$ step feed: pre-denitrification zone 1/anaerobic zone 2=2/8, a water intake of the $A^3O$ device is about 30 m³/d. Samples are collected from an outlet of the sedimentation zone 5 and an outlet of the biological filtration of the $A^3O$ device for a comparison test.

TABLE 2

Comparison results of biological filtration of $A^3O$ process

| Item | | Range for influent water (mg/L) | Mean value for influent water (mg/L) | Range for effluent water (mg/L) | Mean value for effluent water (mg/L) | Removal rate (%) |
|---|---|---|---|---|---|---|
| $COD_{cr}$ | Sedimentation | 280-850 | 460 | 19-40 | 33 | 92.8% |
| | Biological filtration | 280-850 | 460 | 11-28 | 22 | 95.2% |

TABLE 2-continued

Comparison results of biological filtration of $A^3O$ process

| Item | | Range for influent water (mg/L) | Mean value for influent water (mg/L) | Range for effluent water (mg/L) | Mean value for effluent water (mg/L) | Removal rate (%) |
|---|---|---|---|---|---|---|
| Ammonia nitrogen | Sedimentation | 36.9-55.9 | 47.8 | 0.2-2.7 | 1.1 | 97.7% |
| | Biological filtration | 36.9-55.9 | 47.8 | 0.1-0.9 | 0.8 | 98.3% |
| SS | Sedimentation | 160-358 | 234 | 16-33 | 20 | 91.5% |
| | Biological filtration | 160-358 | 234 | 3-9 | 7 | 97.0% |

It can be seen from the above table that, for water with a high $COD_{cr}$ concentration, the biological filtration leads to a significant SS removal effect, and after the biological filtration, an SS concentration can be stably less than 10 mg/L, and effluent water can meet high standards, where the effluent water has a stable $COD_{cr}$ concentration of less than 30 mg/L and a stable ammonia nitrogen concentration of less than 1 mg/L, both of which can meet the requirements of surface water IV and can meet stringent effluent requirements in specific places.

In summary, for sewage with low C/N and C/P ratios, the implementation of the device for advanced nitrogen and phosphorus removal in sewage treatment according to the present disclosure can improve the efficiency of nitrogen and phosphorus removal, such that a total phosphorus removal rate reaches 90%, a total nitrogen removal rate approaches 80%, effluent $COD_{cr}$ stably reaches 15 mg/L to 30 mg/L, effluent ammonia nitrogen is stably below 1 mg/L, and effluent SS is stably below 10 mg/L.

The examples disclosed above are only preferred examples of the present disclosure, and are not intended to limit the claimed scope of the present disclosure. Therefore, equivalent changes made according to the scope of the present disclosure are still within the scope of the present disclosure.

The invention claimed is:

1. A device for advanced nitrogen and phosphorus removal in sewage treatment, comprising a pre-denitrification zone, an anaerobic zone, an anoxic zone, an aerobic zone, a sedimentation zone, a biological filtration zone, and a clear water zone that communicate with each other in sequence according to a sewage treatment process, wherein a sludge return system is provided between the pre-denitrification zone and the sedimentation zone, and the sludge return system is configured to return sludge in the sedimentation zone to the pre-denitrification zone; a nitrification liquid return system is provided between the anoxic zone and the aerobic zone, and the nitrification liquid return system is configured to return a nitrification liquid in the aerobic zone to the anoxic zone; a filler layer is provided in the biological filtration zone, and the filler layer divides a cavity in the biological filtration zone to form an upper water inlet cavity and a lower water outlet cavity; the water inlet cavity communicates with a top of the sedimentation zone, and the water outlet cavity communicates with a bottom of the clear water zone; a backwash aeration pipe is provided in the water outlet cavity, and a backwash water outlet is formed in the water inlet cavity; and the backwash water outlet is connected to a sludge concentration and storage tank or the pre-denitrification zone.

2. The device for advanced nitrogen and phosphorus removal in sewage treatment according to claim 1, wherein the sludge return system comprises a return channel; a sludge outlet end of the return channel is connected to the pre-denitrification zone, and a sludge inlet end of the return channel is connected to the sedimentation zone; and the return channel is a U-shaped flat groove that is horizontally erected on tops of the pre-denitrification zone, the anaerobic zone, the anoxic zone, the aerobic zone, and the sedimentation zone.

3. The device for advanced nitrogen and phosphorus removal in sewage treatment according to claim 2, further comprising a water inlet system, wherein the water inlet system comprises a water inlet main pipe, a first connecting pipe, a second connecting pipe, a third connecting pipe, a first straight union connector, and a second straight union connector; a water inlet end of the water inlet main pipe is connected to an adjusting tank;

according to a water quality of influent water, a water inlet position of a pipeline is adjusted specifically based on the following three arrangements:
1) A first water outlet end of the water inlet main pipe, the second straight union connector, the second connecting pipe, the first straight union connector, and the first connecting pipe are connected in sequence to form a first water inlet channel communicating with the pre-denitrification zone; a second water outlet end of the water inlet main pipe and the third connecting pipe are connected in sequence to form a second water inlet channel communicating with the sludge inlet end of the return channel; and the sludge outlet end of the return channel communicates with the pre-denitrification zone;
2) The first water outlet end of the water inlet main pipe, the second straight union connector, and the second connecting pipe are connected in sequence to form a third water inlet channel communicating with the anaerobic zone; the second water outlet end of the water inlet main pipe and the third connecting pipe are connected in sequence to form the second water inlet channel communicating with the sludge inlet end of the return channel; and the sludge outlet end of the return channel communicates with the pre-denitrification zone;
3) The first water outlet end of the water inlet main pipe and the second straight union connector are connected in sequence to form a fourth water inlet channel communicating with the anoxic zone; the second water outlet end of the water inlet main pipe and the third connecting pipe are connected in sequence to form the second water inlet channel communicating with the sludge inlet end of the return channel; and the sludge outlet end of the return channel communicates with the pre-denitrification zone; and
a first valve is provided at the first water outlet end of the water inlet main pipe, and a second valve is provided at the second water outlet end of the water inlet main pipe.

4. The device for advanced nitrogen and phosphorus removal in sewage treatment according to claim 3, wherein when the water inlet position of the pipeline is in arrangement 2), a water intake of the pre-denitrification zone accounts for 5% to 30% of the total water intake, and a water intake of the anaerobic zone accounts for 70% to 95% of the total water intake.

5. The device for advanced nitrogen and phosphorus removal in sewage treatment according to claim 1, wherein the anoxic zone is composed of at least one anoxic tank, and when there are two or more anoxic tanks, the two or more anoxic tanks communicate with each other in sequence; and the aerobic zone is composed of at least one aerobic tank, and when there are two or more aerobic tanks, the two or more aerobic tanks communicate with each other in sequence.

6. The device for advanced nitrogen and phosphorus removal in sewage treatment according to claim 1, wherein a PAC agent addition device is provided at a tail end of the aerobic zone.

7. The device for advanced nitrogen and phosphorus removal in sewage treatment according to claim 1, wherein a disinfection device is provided at a tail end of the clear water zone.

8. The device for advanced nitrogen and phosphorus removal in sewage treatment according to claim 1, wherein a carbon source addition device is provided at a head end of each of the pre-denitrification zone, the anaerobic zone, and the anoxic zone.

9. The device for advanced nitrogen and phosphorus removal in sewage treatment according to claim 1, wherein the backwash water outlet is close to an upper surface of the filler layer.

10. The device for advanced nitrogen and phosphorus removal in sewage treatment according to claim 1, wherein a height of the filler layer accounts for 20% to 70% of a height of the biological filtration zone.

11. The device for advanced nitrogen and phosphorus removal in sewage treatment according to claim 1, wherein a solenoid valve is provided at an air inlet end of the backwash aeration pipe.

12. The device for advanced nitrogen and phosphorus removal in sewage treatment according to claim 1, wherein the backwash water outlet is connected to the sludge concentration and storage tank or the pre-denitrification zone through a first air stripping device.

13. The device for advanced nitrogen and phosphorus removal in sewage treatment according to claim 1, wherein the sludge return system further comprises a second air stripping device, and the second air stripping device is configured to return the sludge in the sedimentation zone to the pre-denitrification zone through air stripping.

14. The device for advanced nitrogen and phosphorus removal in sewage treatment according to claim 1, wherein the nitrification liquid return system comprises a third air stripping device, and the third air stripping device is configured to return the nitrification liquid in the aerobic zone to the anoxic zone.

15. The device for advanced nitrogen and phosphorus removal in sewage treatment according to claim 1, wherein a top of a partition wall between the aerobic zone and the sedimentation zone is provided with a filler intercepting grid device; the filler intercepting grid device comprises a grid for intercepting a filler and fiber debris in the aerobic zone and a first aeration pipe for flushing the filler and the fiber debris on the grid; the grid is partly above a liquid level in the aerobic zone; a water inlet side of the grid faces towards the aerobic zone, and a water outlet side of the grid faces towards the sedimentation zone; and at least one first aeration pipe is provided below the grid and close to the water inlet side of the grid.

16. The device for advanced nitrogen and phosphorus removal in sewage treatment according to claim 1, wherein a second aeration pipe is provided in the aerobic zone.

17. The device for advanced nitrogen and phosphorus removal in sewage treatment according to claim 1, wherein a ratio of a volume of the filler in the aerobic zone to an effective volume of the aerobic zone is 0.2 to 0.6.

18. The device for advanced nitrogen and phosphorus removal in sewage treatment according to claim 1, wherein the sedimentation zone is provided with a water storage tank and a plurality of sludge buckets; each side wall of the water storage tank is a corrugated plate; the plurality of sludge buckets are arranged side by side at a bottom of the water storage tank; a connecting plate is provided between a recess of the corrugated plate and a top of the sludge bucket; a shape of the connecting plate matches a shape of the recess of the corrugated plate, and the connecting plate is inclined downwards from the corrugated plate to the sludge bucket; the water storage tank, the sludge bucket, and the connecting plate are each coated with an anti-corrosive paint; an water inlet is formed at a lower part of the side wall of the water storage tank; and the sludge bucket has an inverted cone structure.

19. The device for advanced nitrogen and phosphorus removal in sewage treatment according to claim 1, wherein the sedimentation zone is provided with an air-stripping skimming device; the air-stripping skimming device comprises a skimmer, a first vertical pipe, a second vertical pipe, an expansion joint, an air-stripping mechanism, and an output main pipe; the skimmer is suspended above a liquid surface in the sedimentation zone; a scum outlet end of the skimmer is connected to an upper end of the first vertical pipe, a lower end of the first vertical pipe is connected to an upper end of the expansion joint, a lower end of the expansion joint is connected to an upper end of the second vertical pipe, a lower end of the second vertical pipe is connected to the output main pipe through the air-stripping mechanism, and an output end of the output main pipe is connected to an adjusting tank outside the device or a front end zone inside the device; the air-stripping mechanism comprises a scum discharge pipe and an air supply pipe; a scum inlet end of the scum discharge pipe is connected to the lower end of the second vertical pipe, and a scum outlet end of the scum discharge pipe is connected to the output main pipe; the air supply pipe has an air inlet and an air outlet; the air inlet is connected to an air pump, and the air outlet is connected to the scum discharge pipe; and the air supply pipe is provided with a valve.

20. The device for advanced nitrogen and phosphorus removal in sewage treatment according to claim 1, wherein the pre-denitrification zone, the anaerobic zone, the anoxic zone, the aerobic zone, the sedimentation zone, the biological filtration zone, and the clear water zone each are provided with a water storage tank; a drainage port is formed on a bottom plate of the water storage tank, and an emptying device is provided at the drainage port; the emptying device comprises a drainage channel and a filter screen; the drainage channel communicates with the drainage port and is fixedly arranged on an outer surface of the bottom plate; a notch of the drainage channel matches the drainage port; a side wall of the drainage channel is provided with a horizontally arranged drainage pipe; the filter screen has a 3D structure and covers above the drainage port; the filter screen is provided with a plurality of filter surfaces, and each of the plurality of filter surfaces is provided with a plurality of filter pores.

* * * * *